US009350573B2

(12) United States Patent
Nentwig et al.

(10) Patent No.: US 9,350,573 B2
(45) Date of Patent: May 24, 2016

(54) APPARATUS AND METHOD FOR REDUCING DISCONTINUITIES BETWEEN WAVEFORMS IN A COMMUNICATION SYSTEM

(75) Inventors: Markus Nentwig, Helsinki (FI); Risto Wichman, Helsinki (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 1411 days.

(21) Appl. No.: 12/977,734

(22) Filed: Dec. 23, 2010

(65) Prior Publication Data

US 2012/0166119 A1    Jun. 28, 2012

(51) Int. Cl.
G06F 19/00    (2011.01)
H04L 25/03    (2006.01)
H04L 1/24    (2006.01)

(52) U.S. Cl.
CPC ............ *H04L 25/0384* (2013.01); *H04L 1/248* (2013.01); *H04L 25/03853* (2013.01)

(58) Field of Classification Search
USPC .......................................................... 702/66
See application file for complete search history.

(56) References Cited

U.S. PATENT DOCUMENTS

2007/0258526 A1    11/2007    Urvas

OTHER PUBLICATIONS

XYZs of Oscilloscopes, Copyright © 2000 Tektronix, Inc. All rights reserved, p. i-38.*

Ken Stone, Final Cut Pro 7—Scopes—Waveform Monitor, Oct. 4, 2009, 26 pages, http://www.kenstone.net/fcp_homepage/fcp_7_scopes_waveform_stone.html.*
"3rd Generation Partnership Project; Technical Specification Group Radio Access Network; Evolved Universal Terrestrial Radio Access (E-UTRA) Radio Resource Control (RRC); Protocol specification (Release 9)", 3GPP TS 36.331 V9.1.0, Technical Specification, Dec. 2009, 233 pages.
"3rd Generaltion Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.7.0, Technical Specification, Dec. 2008, 144 pages.
"3rd Generation Partnership Project; Technical Specification Group Radio Access Network; Evolved Universal Terrestrial Radio Access (E-UTRA); Physical Channels and Modulation (Release 9)", 3GPP TS 36.211 V9.0.0, Technical Specification, Dec. 2009, 85 pages.

(Continued)

*Primary Examiner* — Tung S Lau
(74) *Attorney, Agent, or Firm* — Squire Patton Boggs (US) LLP

(57) ABSTRACT

An apparatus, method and system for reducing discontinuities between waveforms in a communication system. In one embodiment, an apparatus includes a processor and memory including computer program code. The memory and the computer program code are configured, with the processor, to determine an amplitude and set of derivatives at an end point of a first symbol waveform, and determine an amplitude and set of derivatives at a beginning point of a second symbol waveform. The memory and the computer program code are configured, with the processor, to insert a guard period waveform having an amplitude and set of derivatives at a first end to substantially match the amplitude and set of derivatives at the end point of the first symbol waveform and an amplitude and set of derivatives at a second end that substantially matches the amplitude and set of derivatives at the beginning point of the second symbol waveform.

15 Claims, 22 Drawing Sheets

(56) References Cited

OTHER PUBLICATIONS

"3rd Generation Partnership Project; Technical Specification Group Services and System Aspects; Telecommunication management; Home enhanced Node B (heNB) Subsystem (HeNS); Network Resource Model (NRM); Integration Reference Point (IRP); Requirements (Release 9)", 3GPP TS 32.781 V9.1.0, Technical Specification, Mar. 2010, 9 pages.

Weinstein, S.B., et al., "Data Transmission by Frequency-Division Multiplexing Using the Discrete Fourier Transform" IEEE, Transactions on Communication Technology, vol. Com-19, No. 5, Oct. 1971, pp. 628-634.

Van De Beek, et al., "N-continuous OFDM" IEEE, Communications Letters, vol. 13 No. 1, Jan. 2009, 3 pages.

Van De Beel, et al., "EVM-constrained OFDM precoding for reduction of out-of-band emission", IEEE, 70th Vehicular Technology Conference Fall, Sep. 20, 2009, 5 pages.

* cited by examiner

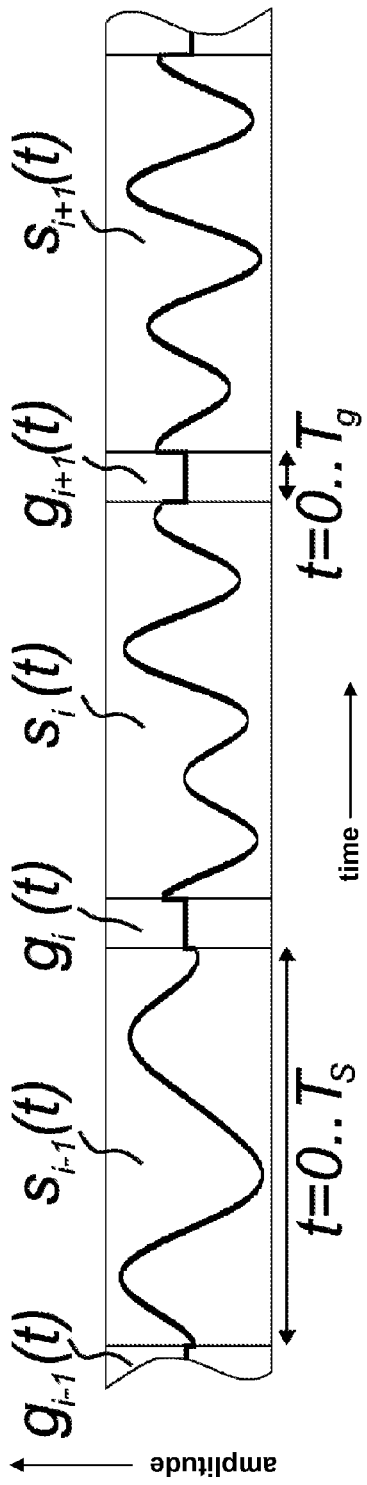
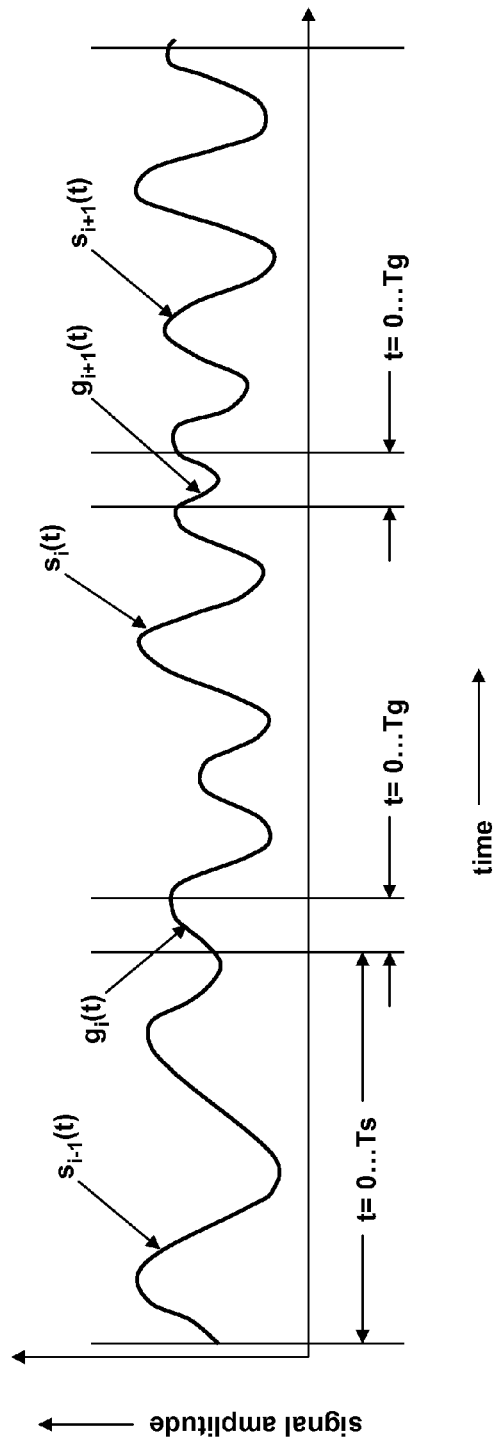
FIGURE 6
FIGURE 7

APPARATUS AND METHOD FOR REDUCING DISCONTINUITIES BETWEEN WAVEFORMS IN A COMMUNICATION SYSTEM

TECHNICAL FIELD

The present invention is directed, in general, to communication systems and, in particular, to an apparatus, method and system for reducing discontinuities between waveforms in a communication system.

BACKGROUND

Long term evolution ("LTE") of the Third Generation Partnership Project ("3GPP"), also referred to as 3GPP LTE, refers to research and development involving the 3GPP LTE Release 8 and beyond, which is the name generally used to describe an ongoing effort across the industry aimed at identifying technologies and capabilities that can improve systems such as the universal mobile telecommunication system ("UMTS"). The notation "LTE-A" is generally used in the industry to refer to further advancements in LTE. The goals of this broadly based project include improving communication efficiency, lowering costs, improving services, making use of new spectrum opportunities, and achieving better integration with other open standards.

The evolved universal terrestrial radio access network ("E-UTRAN") in 3GPP includes base stations providing user plane (including packet data convergence protocol/radio link control/media access control/physical ("PDCP/RLC/MAC/PHY") sublayers) and control plane (including a radio resource control ("RRC") sublayer) protocol terminations towards wireless communication devices such as cellular telephones. A wireless communication device or terminal is generally known as user equipment (also referred to as "UE"). A base station is an entity of a communication network often referred to as a Node B or an NB. Particularly in the E-UTRAN, an "evolved" base station is referred to as an eNodeB or an eNB. For details about the overall architecture of the E-UTRAN, see 3GPP Technical Specification ("TS") 36.300 v8.7.0 (2008-12), which is incorporated herein by reference. For details of the communication or radio resource control management, see 3GPP TS 25.331 v.9.1.0 (2009-12) and 3GPP TS 36.331 v.9.1.0 (2009-12), which are incorporated herein by reference.

As wireless radio communication systems such as cellular telephone, satellite, and microwave communication systems become widely deployed and continue to attract a growing number of users, there is a pressing need to accommodate efficiently a large and variable number of communication devices that transmit an increasing quantity of data within a fixed spectral allocation and limited transmitter power levels. The increased quantity of data is a consequence of wireless communication devices transmitting video information and surfing the Internet, as well as performing ordinary voice communications. Such processes are generally performed while accommodating substantially simultaneous operation of a large number of wireless communication devices.

At present, there are mainly two kinds of wireless communication system or network architectures, centralized and distributed. A centralized communication network can be taken as a conventional infrastructure-based cellular communication network whereas an ad-hoc communication network exemplifies a distributed communication network. In a centralized cellular communication network (also referred to as a primary communication system), a wireless communication device such as user equipment communicates with another wireless communication device such as user equipment through a base station, which is also referred to as primary spectrum usage. However, in an ad-hoc communication network (also referred to as a secondary communication system), the user equipment communicates directly with another user equipment (or through a relay), which is also referred to as secondary spectrum usage. In the primary communication system, traffic goes through a centralized network control element such as a base station even if the source and destination user equipment are close to each other. The main benefit of such operation is easier communication resource and interference control, but the obvious drawback is inefficient communication resource utilization. For example, significantly more communication resources are generally required for cellular communications (or a cellular communication mode) compared to a device-to-device ("D2D") communications (or D2D communication mode) when the user equipment are relatively close.

Thus, it may be beneficial for spectrum to be opportunistically shared between centralized and distributed communication systems. For example, unlicensed distributed communication devices such as wireless local area network ("WLAN") communication devices will coexist with overlapping spectrum with licensed users such as cellular communication devices. Interference-aware resource scheduling and dynamic channel allocation may become common practice.

Orthogonal frequency division multiplexing ("OFDM") is a modulation candidate for sharing a frequency band between centralized and distributed communication devices because the spectrum of the transmitted signal is shaped by assigning or de-assigning subcarriers to a given frequency range. Single-carrier frequency division multiple access ("SC-FDMA") is another modulation candidate for sharing a frequency band between centralized and distributed communication devices. However, a well-recognized problem in OFDM and SC-FDMA signal generation is the generation of relatively high sidelobes in the transmitted signal.

In conventional radio communication systems, sidelobes are not a major concern. Usually, a limiting factor is linearity of a power amplifier of a transmitter (or transceiver), which results in typical adjacent channel power ratios between −25 dBc (the power ratio in decibels of a signal to a carrier signal) to −45 dBc. A communication system is designed for a worst-case scenario (i.e., the transmitter running at full power), and a sufficient width of guard bands is allocated between adjacent channels, for example, ten percent in a LTE-based communication system or a wireless local area network. Additionally, discontinuities in nearby or adjacent symbols (or symbol waveforms) should be taken into account.

In future communication systems, the rigid channel structure of today's communication systems may not apply. For example, in opportunistic channel reuse, a communication device may detect an opportunity to transmit in a narrow frequency band in the presence of other communication devices operating on nearby frequencies that may not be interfered. Often, such transmit opportunities may be exploited using only a fraction of a maximum possible transmit power of the power amplifier. When the power amplifier is not used at its maximum rated power, distortion products caused by the power amplifier become small and other mechanisms start to dominate unwanted emissions into adjacent channels. One such mechanism is caused by waveform discontinuities at boundaries between symbols, referred to as "sinc leakage" (sinus cardinalis). Filtering as used, for instance, in communication devices for LTE-based communication systems, is inefficient to suppress sinc leakage for discontinuous transmit bands.

Thus, there is need for an improved system and method that can address interference issues for communication devices operable in primary and secondary communication systems that avoid the deficiencies of the present communication systems.

SUMMARY OF THE INVENTION

These and other problems are generally solved or circumvented, and technical advantages are generally achieved, by embodiments of the present invention, which include an apparatus, method and system for reducing discontinuities between waveforms in a communication system. In one embodiment, an apparatus includes a processor and memory including computer program code. The memory and the computer program code are configured, with the processor, to determine an amplitude and set of derivatives at an end point of a first symbol waveform, and determine an amplitude and set of derivatives at a beginning point of a second symbol waveform. The memory and the computer program code are further configured, with the processor, to insert a guard period waveform having an amplitude and set of derivatives at a first end to substantially match the amplitude and set of derivatives at the end point of the first symbol waveform and an amplitude and set of derivatives at a second end that substantially matches the amplitude and set of derivatives at the beginning point of the second symbol waveform.

In another embodiment, an apparatus includes a processor and memory including computer program code. The memory and the computer program code are configured, with the processor, to determine an amplitude of an end point of a first waveform, and determine a point on a second waveform having an amplitude to substantially match the amplitude of the end point of the first waveform. The memory and the computer program code are further configured, with the processor, to append a beginning portion of the second waveform before the point to an end point of the second waveform.

The foregoing has outlined rather broadly the features and technical advantages of the present invention in order that the detailed description of the invention that follows may be better understood. Additional features and advantages of the invention will be described hereinafter, which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the invention, and the advantages thereof, reference is now made to the following descriptions taken in conjunction with the accompanying drawings, in which:

FIG. 6 illustrates a graphical representation of exemplary waveforms that provide an environment for application of the principles of the present invention;

FIG. 7 illustrates a graphical representation of exemplary waveforms according to the principles of the present invention;

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention. In view of the foregoing, the present invention will be described with respect to exemplary embodiments in a specific context of an apparatus, method and system to generate guard period waveforms for insertion between a pair of transmitted symbol waveforms, or to reorder the temporal sequence of a symbol waveform that follows a previous symbol waveform. The apparatus, method and system are applicable, without limitation, to any communication system including existing and future 3GPP technologies such as UMTS, LTE, Global System for Mobile Communications ("GSM"), and its future variants such as 4th generation ("4G") communication systems.

Figure 1:
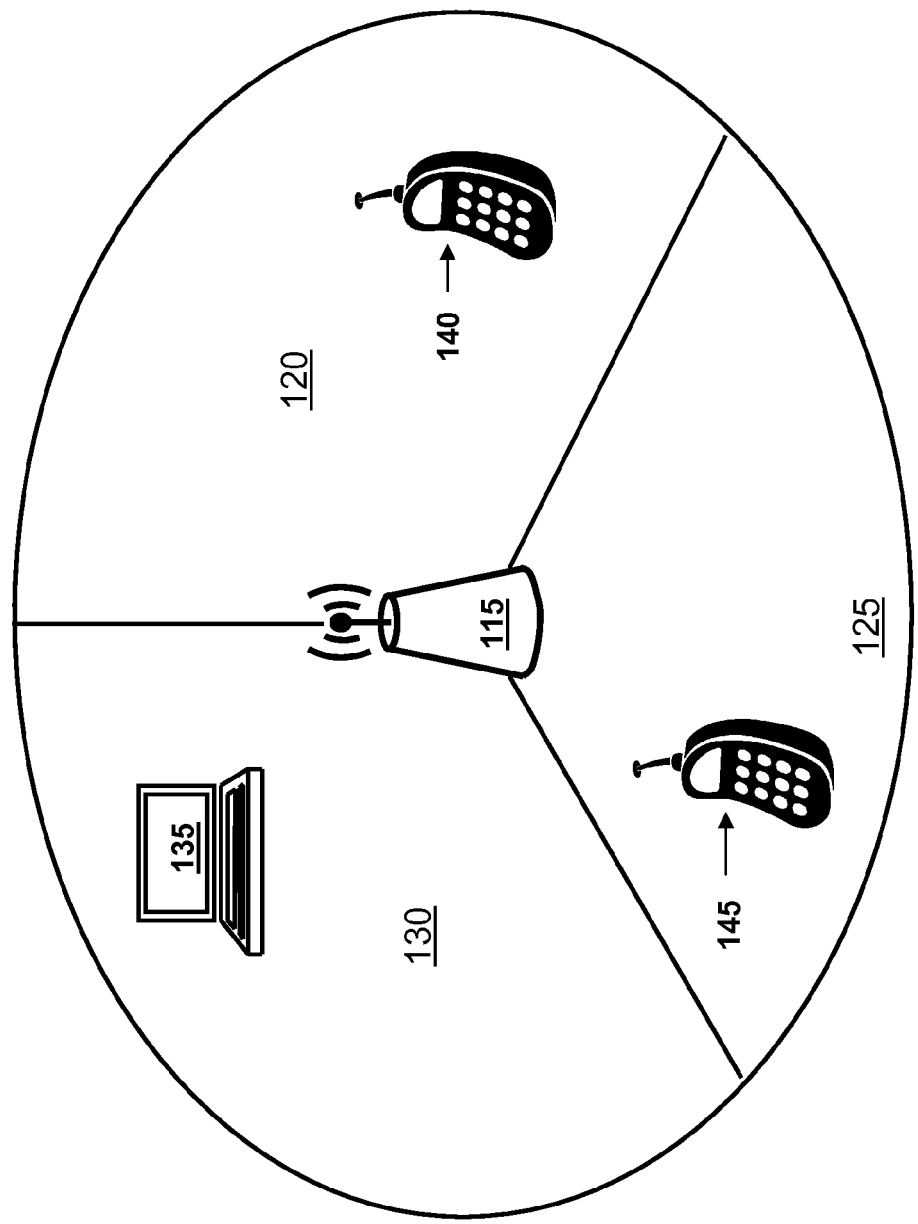
FIGS. 1 and 2 illustrate system level diagrams of embodiments of communication systems including a base station and wireless communication devices that provide an environment for application of the principles of the present invention.

Turning now to FIG. 1, illustrated is a system level diagram of an embodiment of a communication system including a base station 115 and wireless communication devices (e.g., user equipment) 135, 140, 145 that provides an environment for application of the principles of the present invention. The base station 115 is coupled to a public switched telephone network (not shown). The base station 115 is configured with a plurality of antennas to transmit and receive signals in a plurality of sectors including a first sector 120, a second sector 125, and a third sector 130, each of which typically spans 120 degrees. The three sectors or more than three sectors are configured per frequency, and one base station 115 can support more than one frequency. Although FIG. 1 illustrates one wireless communication device (e.g., wireless communication device 140) in each sector (e.g. the first sector 120), a sector (e.g. the first sector 120) may generally contain a plurality of wireless communication devices. In an alternative embodiment, a base station 115 may be formed with only one sector (e.g. the first sector 120), and multiple base stations may be constructed to transmit according to co-operative multi-input/multi-output ("C-MIMO") operation, etc.

The sectors (e.g. the first sector 120) are formed by focusing and phasing radiated signals from the base station antennas, and separate antennas may be employed per sector (e.g. the first sector 120). The plurality of sectors 120, 125, 130 increases the number of subscriber stations (e.g., the wireless communication devices 135, 140, 145) that can simultaneously communicate with the base station 115 without the need to increase the utilized bandwidth by reduction of interference that results from focusing and phasing base station antennas. While the wireless communication devices 135, 140, 145 are part of a primary communication system, the wireless communication devices 135, 140, 145 and other devices such as machines (not shown) may be a part of a secondary communication system to participate in, without limitation, D2D and machine-to-machine communications or other communications. Additionally, the wireless communication devices 135, 140, 145 may form communication nodes along with other devices in the communication system.

Figure 2:
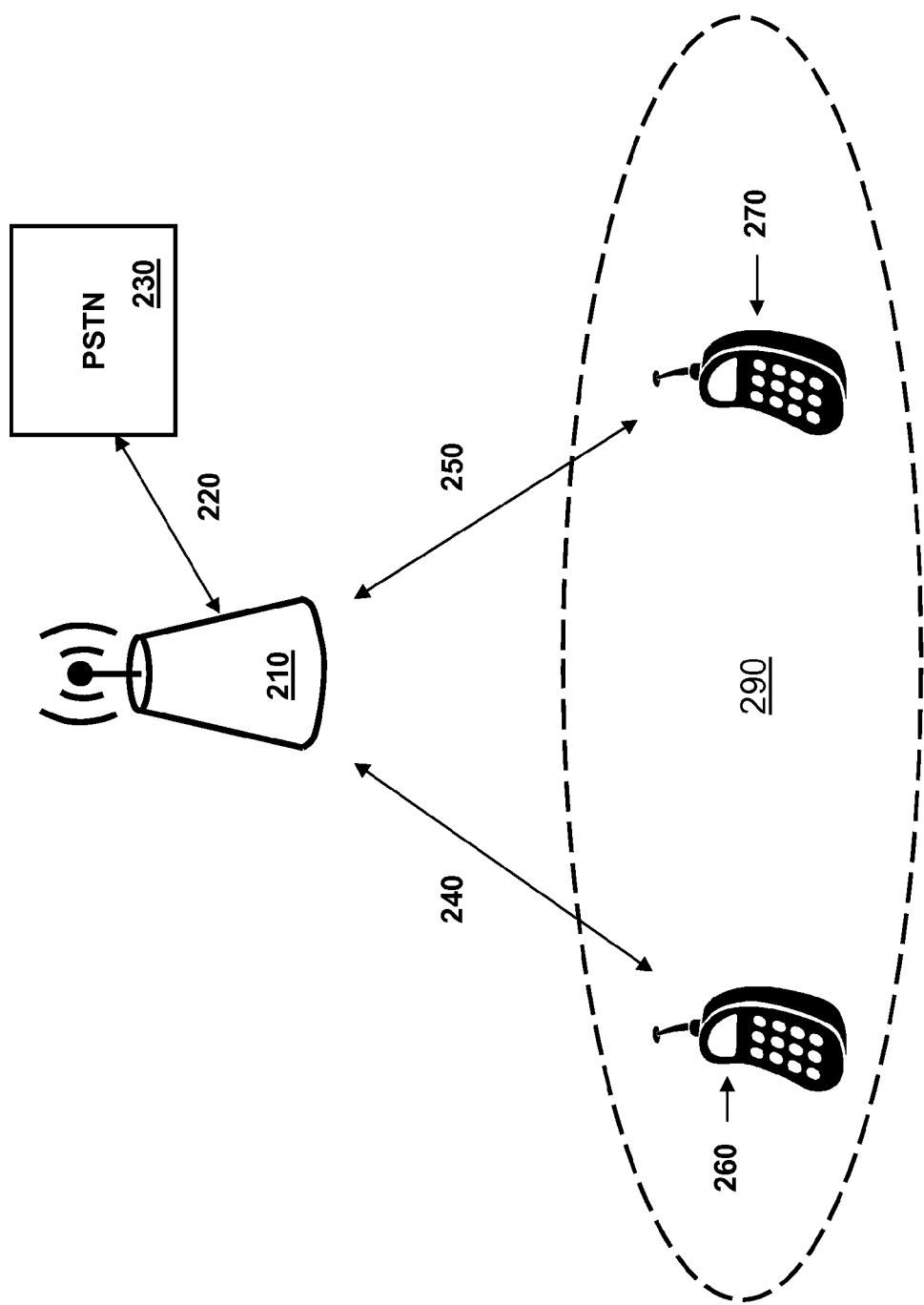

Turning now to FIG. 2, illustrated is a system level diagram of an embodiment of a communication system including a base station 210 and wireless communication devices (e.g., user equipment) 260, 270 that provides an environment for application of the principles of the present invention. The communication system includes the base station 210 coupled by communication path or link 220 (e.g., by a fiber-optic communication path) to a core telecommunications network such as public switched telephone network ("PSTN") 230. The base station 210 is coupled by wireless communication paths or links 240, 250 to the wireless communication devices 260, 270, respectively, that lie within its cellular area 290.

In operation of the communication system illustrated in FIG. 2, the base station 210 communicates with each wireless communication device 260, 270 through control and data communication resources allocated by the base station 210 over the communication paths 240, 250, respectively. The control and data communication resources may include frequency and time-slot communication resources in frequency division duplex ("FDD") and/or time division duplex ("TDD") communication modes. While the wireless communication devices 260, 270 are part of a primary communication system, the wireless communication devices 260, 270 and other devices such as machines (not shown) may be a part of a secondary communication system to participate in, without limitation, device-to-device and machine-to-machine communications or other communications. Additionally, the wireless communication devices 260, 270 may form communication nodes along with other devices in the communication system.

Figure 3:
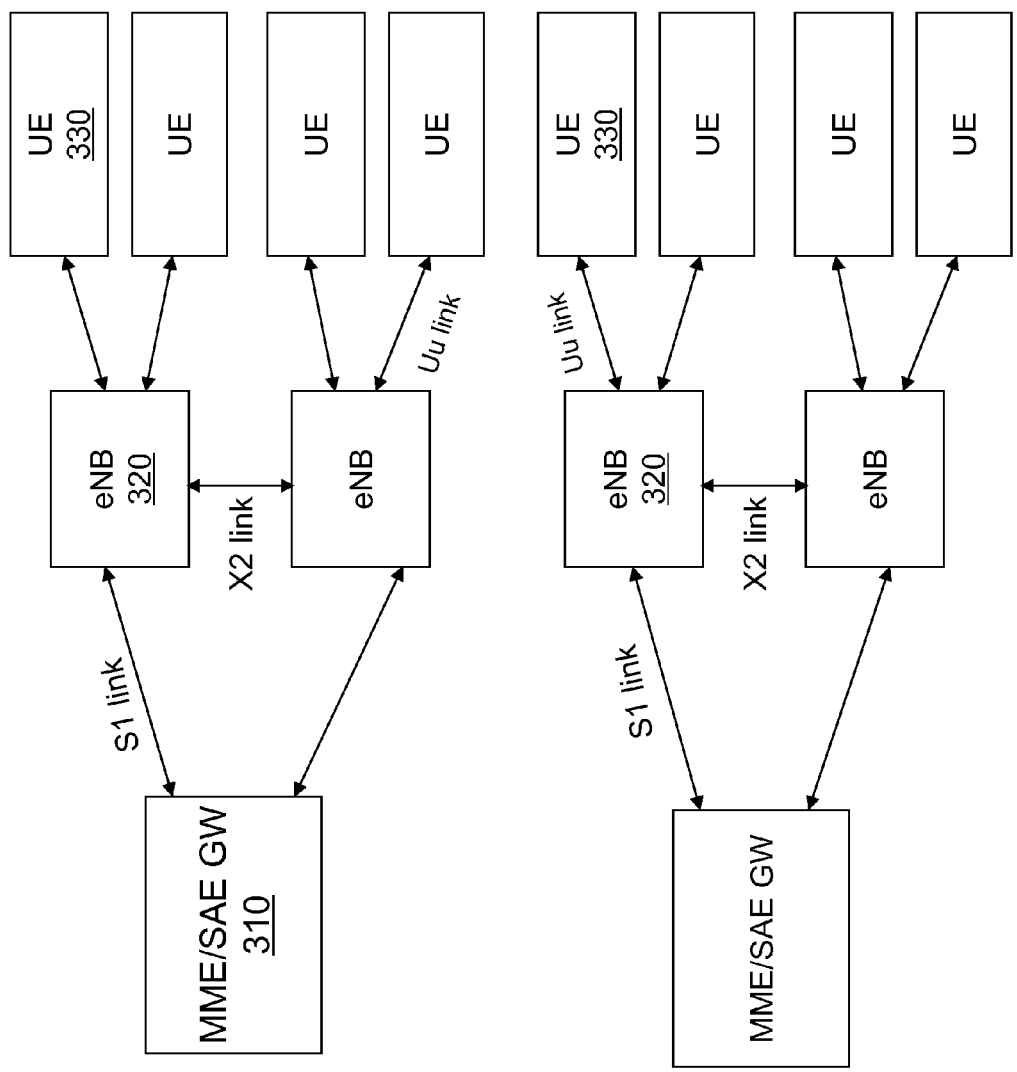
FIGS. 3 and 4 illustrate system level diagrams of embodiments of communication systems including wireless communication systems that provide an environment for application of the principles of the present invention.

Turning now to FIG. 3, illustrated is a system level diagram of an embodiment of a communication system including a wireless communication system that provides an environment for the application of the principles of the present invention. The wireless communication system may be configured to provide evolved UMTS terrestrial radio access network ("E-UTRAN") universal mobile telecommunications services. A mobile management entity/system architecture evolution gateway ("MME/SAE GW," one of which is designated 310) provides control functionality for an E-UTRAN node B (designated "eNB," an "evolved node B," also referred to as a "base station," one of which is designated 320) via an S1 communication link (ones of which are designated "S1 link"). The base stations 320 communicate via X2 communication links (ones of which are designated "X2 link"). The various communication links are typically fiber, microwave, or other high-frequency communication paths such as coaxial links, or combinations thereof.

The base stations 320 communicate with wireless communication devices such as user equipment ("UE," ones of which are designated 330), which is typically a mobile transceiver carried by a user. Thus, the communication links (designated "Uu" communication links, ones of which are designated "Uu link") coupling the base stations 320 to the user equipment 330 are air links employing a wireless communication signal such as, for example, an orthogonal frequency division multiplex ("OFDM") signal. While the user equipment 330 are part of a primary communication system, the user equipment 330 and other devices such as machines (not shown) may be a part of a secondary communication system to participate in, without limitation, D2D and machine-to-machine communications or other communications. Additionally, the user equipment 330 may form a communication node along with other devices in the communication system.

Figure 4:
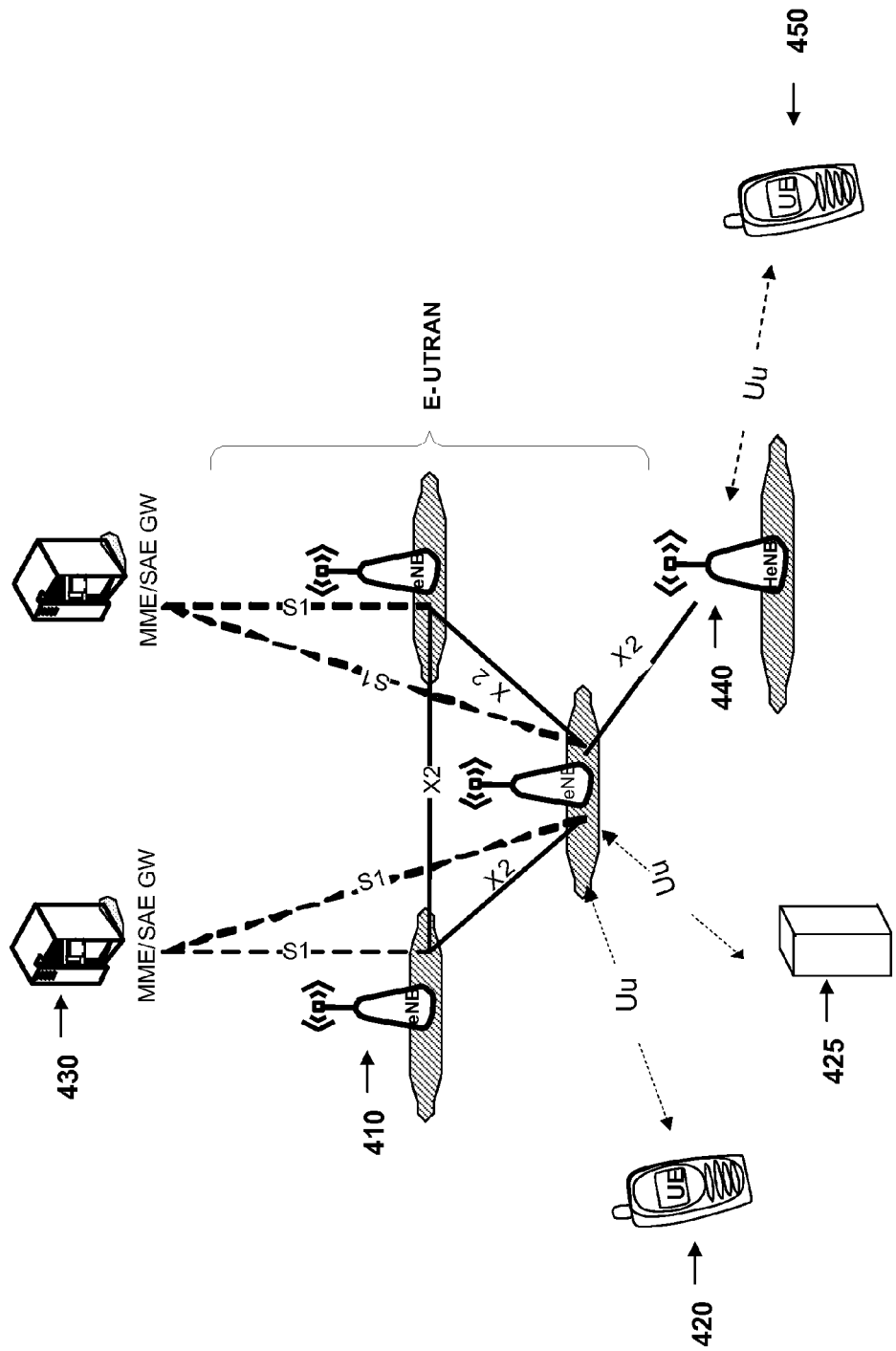

Turning now to FIG. 4, illustrated is a system level diagram of an embodiment of a communication system including a wireless communication system that provides an environment for the application of the principles of the present invention. The wireless communication system provides an E-UTRAN architecture including base stations (one of which is designated 410) providing E-UTRAN user plane (packet data convergence protocol/radio link control/media access control/physical) and control plane (radio resource control) protocol terminations towards wireless communication devices such as user equipment 420 and other devices such as machines 425 (e.g., an appliance, television, meter, etc.). The base stations 410 are interconnected with X2 interfaces or communication links (designated "X2") and are connected to the wireless communication devices such as user equipment 420 and other devices such as machines 425 via Uu interfaces or communication links (designated "Uu"). The base stations 410 are also connected by S1 interfaces or communication links (designated "S1") to an evolved packet core ("EPC")

including a mobile management entity/system architecture evolution gateway ("MME/SAE GW," one of which is designated 430). The S1 interface supports a multiple entity relationship between the mobile management entity/system architecture evolution gateway 430 and the base stations 410. For applications supporting inter-public land mobile handover, inter-eNB active mode mobility is supported by the mobile management entity/system architecture evolution gateway 430 relocation via the S1 interface.

The base stations 410 may host functions such as radio resource management. For instance, the base stations 410 may perform functions such as Internet protocol ("IP") header compression and encryption of user data streams, ciphering of user data streams, radio bearer control, radio admission control, connection mobility control, dynamic allocation of communication resources to user equipment in both the uplink and the downlink, selection of a mobility management entity at the user equipment attachment, routing of user plane data towards the user plane entity, scheduling and transmission of paging messages (originated from the mobility management entity), scheduling and transmission of broadcast information (originated from the mobility management entity or operations and maintenance), and measurement and reporting configuration for mobility and scheduling. The mobile management entity/system architecture evolution gateway 430 may host functions such as distribution of paging messages to the base stations 410, security control, termination of user plane packets for paging reasons, switching of user plane for support of the user equipment mobility, idle state mobility control, and system architecture evolution bearer control. The user equipment 420 and machines 425 receive an allocation of a group of information elements from the base stations 410.

Additionally, the ones of the base stations 410 are coupled a home base station 440 (a device), which is coupled to devices such as user equipment 450 and/or machines (not shown) for a secondary communication system. The base station 410 can allocate secondary communication system resources directly to the user equipment 450 and machines, or to the home base station 440 for communications (e.g., local or D2D communications) within the secondary communication system. Additionally, the secondary communication resources can be selected by the user equipment 450 and machines without intervention by the base station 410 for the D2D communications in a distributed manner. The secondary communication resources can overlap with communication resources employed by the base station 410 to communicate with the user equipment 420 within its serving area. For a better understanding of home base stations (designated "HeNB"), see 3 GPP TS 32.781 v.9.1.0 (2010-03), which is incorporated herein by reference. While the user equipment 420 and machines 425 are part of a primary communication system, the user equipment 420, machines 425 and home base station 440 (communicating with other user equipment 450 and machines (not shown)) may be a part of a secondary communication system to participate in, without limitation, D2D and machine-to-machine communications or other communications. Additionally, the user equipment 420 and machines 425 may form communication nodes along with other devices in the communication system.

Figure 5:
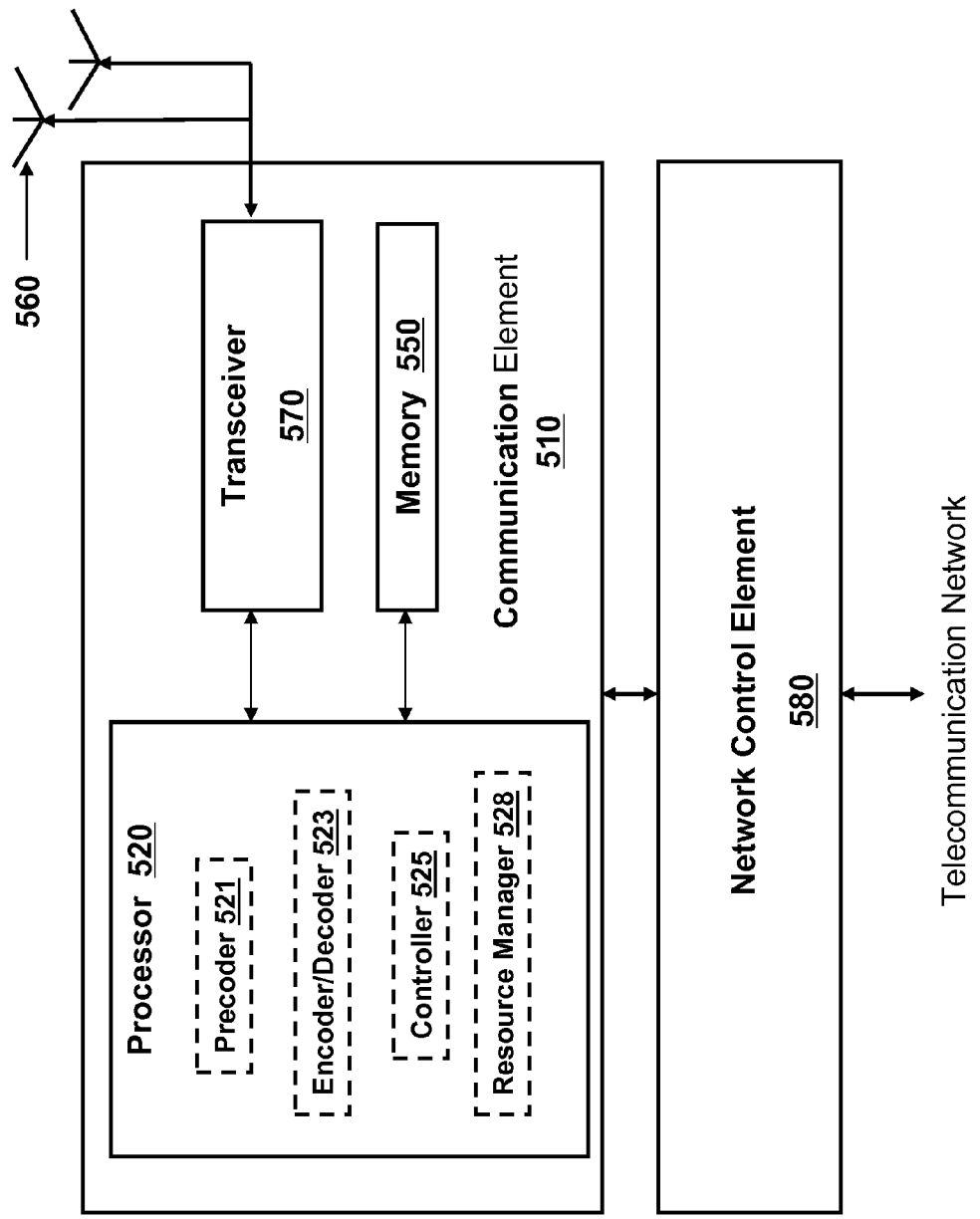
FIG. 5 illustrates a system level diagram of an embodiment of a communication element of a communication system for application of the principles of the present invention.

Turning now to FIG. 5, illustrated is a system level diagram of an embodiment of a communication element 510 of a communication system for application of the principles of the present invention. The communication element or device 510 may represent, without limitation, a base station, a wireless communication device (e.g., a subscriber station, terminal, mobile station, user equipment, machine), a network control element, a communication node, or the like. Additionally, the communication element or device 510 may form a communication node along with other devices in the communication system. When the communication element or device 510 represents a communication node such as a user equipment, the user equipment may be configured to communicate with another communication node such as another user equipment employing one or more base stations as intermediaries in the communication path (referred to as cellular communications). The user equipment may also be configured to communicate directly with another user equipment without direct intervention of the base station in the communication path (referred to a D2D communications). The communication element 510 includes, at least, a processor 520, memory 550 that stores programs and data of a temporary or more permanent nature, an antenna 560, and a radio frequency transceiver 570 coupled to the antenna 560 and the processor 520 for bidirectional wireless communications. The communication element 510 may be formed with a plurality of antennas to enable a multiple-input/multiple-output ("MIMO") mode of operation. The communication element 510 may provide point-to-point and/or point-to-multipoint communication services.

The communication element 510, such as a base station in a cellular communication system or network, may be coupled to a communication network element, such as a network control element 580 of a public switched telecommunication network ("PSTN"). The network control element 580 may, in turn, be formed with a processor, memory, and other electronic elements (not shown). The network control element 580 generally provides access to a telecommunication network such as a PSTN. Access may be provided using fiber optic, coaxial, twisted pair, microwave communications, or similar link coupled to an appropriate link-terminating element. A communication element 510 formed as a wireless communication device is generally a self-contained device intended to be carried by an end user.

The processor 520 in the communication element 510, which may be implemented with one or a plurality of processing devices, performs functions associated with its operation including, without limitation, precoding of antenna gain/phase parameters (precoder 521), encoding and decoding (encoder/decoder 523) of individual bits forming a communication message, formatting of information, and overall control (controller 525) of the communication element, including processes related to management of communication resources (resource manager 528). Exemplary functions related to management of communication resources include, without limitation, hardware installation, traffic management, performance data analysis, tracking of end users and equipment, configuration management, end user administration, management of wireless communication devices, management of tariffs, subscriptions, security, billing and the like.

The execution of all or portions of particular functions or processes related to management of communication resources or otherwise may be performed in equipment separate from and/or coupled to the communication element 510, with the results of such functions or processes communicated for execution to the communication element 510. The processor 520 of the communication element 510 may be of any type suitable to the local application environment, and may include one or more of general-purpose computers, special purpose computers, microprocessors, digital signal processors ("DSPs"), field-programmable gate arrays ("FPGAs"), application-specific integrated circuits ("ASICs"), and processors based on a multi-core processor architecture, as non-limiting examples.

The transceiver 570 of the communication element 510 modulates information on to a carrier waveform for transmission by the communication element 510 via the antenna(s) 560 to another communication element. The transceiver 570 may include a power amplifier to amplify the modulated carrier waveform for the transmission by the communication element 510. The transceiver 570 demodulates information received via the antenna(s) 560 for further processing by other communication elements. The transceiver 570 is capable of supporting duplex operation for the communication element 510.

The memory 550 of the communication element 510, as introduced above, may be one or more memories and of any type suitable to the local application environment, and may be implemented using any suitable volatile or nonvolatile data storage technology such as a semiconductor-based memory device, a magnetic memory device and system, an optical memory device and system, fixed memory, and removable memory. The programs stored in the memory 550 may include program instructions or computer program code that, when executed by an associated processor, enable the communication element 510 to perform tasks as described herein. Of course, the memory 550 may form a data buffer for data transmitted to and from the communication element 510. Exemplary embodiments of the system, subsystems, and modules as described herein may be implemented, at least in part, by computer software executable by processors of, for instance, the wireless communication device and the base station, or by hardware, or by combinations thereof. As will become more apparent, systems, subsystems and modules may be embodied in the communication element 510 as illustrated and described herein.

Guard bands that span a narrow range of frequencies are frequently employed in communication systems to separate communication channels that lie on adjacent frequencies. In future communication systems, guard bands may be smaller than those employed in current communication systems, or may not be available at all. The requirements on unwanted emissions to nearby frequencies for communication devices may be very strict, especially if unwanted emissions cause interference to an existing communication system that operates on a licensed portion of the spectrum. In OFDM communication systems (including SC-FDMA), a main source of unwanted emissions is discontinuities in amplitude and/or phase between adjacent symbols (or waveforms of adjacent symbols). A general description of OFDM modulation is contained in the paper by S. B. Weinstein and Paul M. Ebert entitled "Data Transmission by Frequency-Division Multiplexing Using the Discrete Fourier Transform," IEEE Transactions on Communication Technology, No. 5, pp. 628-634, October 1971, which is incorporated herein by reference.

Present communication systems are often intentionally specified to allow some amount of out-of-band emissions, and various techniques are employed to reduce out-of-band emissions. For example, "windowing" can be employed, wherein cyclic extensions of adjacent symbols are overlapped and weighted to ramp amplitude and/or phase down or up. A disadvantage of windowing is it requires a relatively long symbol overlap time. Filtering is another option that can be used to provide adequate separation between communication channels. For example, a finite impulse response ("FIR") filter employing about 20 filter taps may be used for such purposes. A disadvantage of filtering is that it is generally impractical for a fragmented spectrum. It is almost impossible to get steep enough edges in the filter response because of the inherent time-bandwidth limitations of a practical, realizable linear filter. Cancellation of subcarriers ("SCs") has also been attempted. For instance, guard band subcarriers are chosen to reduce emissions, which can be moderately effective.

Other conventional approaches to limit the effect of spurious emissions in adjacent communication channels include employing N-continuous derivatives of a signal (or waveform) formed by OFDM modulation techniques are described by J. van de Beek and F. Berggren in the paper entitled "N-continuous OFDM," IEEE Communications Letters, pp. 1-3, January 2009, which is incorporated herein by reference. A waveform is modified as described in the aforementioned reference to be continuous in its value and N derivatives. This approach can be highly effective, but causes signal distortion and is computationally quite complex. Another conventional approach is described by J. van de Beek and F. Berggren in the paper entitled "EVM-Constrained OFDM Precoding for Reduction of out of Band Emission," 2009 IEEE 70th Vehicular Technology Conference Fall (VTC 2009-Fall), pp. 1-5, Sep. 20, 2009, which is incorporated herein by reference. Less distortion is produced than that described in the first van de Beek reference, but its implementation is even more computationally complex.

Turning now to FIG. 6, illustrated is a graphical representation of exemplary waveforms (e.g., OFDM waveforms) that provide an environment for application of the principles of the present invention. As illustrated in FIG. 6, a sequence of symbol waveforms $s_{i-1}(t)$, $s_i(t)$, $s_{i+i}(t)$ are separated or bounded by guard period waveforms $g_{i-1}(t)$, $g_i(t)$, $g_{i+1}(t)$ and include a leading cyclic prefix. The discontinuities in amplitude of the symbol waveforms at borders (such as at the border between the symbol waveform $s_{i-1}(t)$ and the symbol waveform $s_i(t)$) cause the unwanted emissions in question. The amplitude of a waveform and its derivatives, as is well known in the art, are generally complex quantities that can be represented with real and imaginary parts.

The symbol waveform $s_i(t)$ is preceded by a guard period waveform $g_i(t)$ that separates it from the earlier symbol waveform $s_{i-1}(t)$. The duration $T_s$ is the length over time of each symbol waveform, and the duration $T_g$ is the length over time of each guard period waveform. A separate time variable t is defined for each individual segment $s_i$ and $g_i$, shifting the time origin to the start of the respective segment.

As introduced herein, a continuous time symbol waveform $s_i(t)$ is first constructed by adding symbol basis waveforms (e.g., subcarriers), weighted with the corresponding weighting coefficient $d_{i,k}$ of each symbol basis waveform k as illustrated by equation (1):

$$s_i(t) = \sum_{k \in K} d_{i,k} e^{j2\pi k \frac{t}{T_s}}. \qquad (1)$$

Equation (1) is implemented using a discrete inverse fast Fourier transform ("IFFT") followed by subsequent low pass filtering. To confine the emission spectrum of guard period waveform $g_i(t)$ to the bandwidth occupied by symbol basis waveforms in the symbol waveform $s_i(t)$, the guard period waveform $g_i(t)$ is constructed using a set of guard period basis waveforms (a set of basis waveforms) $b_k(t)$ with k∈L. The set of guard period basis waveforms may form a subset of symbol basis waveforms (i.e., $$b_k(t) = e^{j2\pi k \frac{t}{T_s}}$$

and L⊆K), truncated to the duration of the guard period. The set of guard period basis waveforms may be identical to the set of symbol basis waveforms (i.e., $L = K$ and $b_k(t) = e^{j2\pi k \frac{t}{T_S}}$), truncated to the duration of the guard period. Each guard period basis waveform is scaled with a weighting coefficient $c_i$ as represented below by equation (2) to produce guard period waveform $g_i(t)$:

$$g_i(t) = \sum_{k \in L} c_{i,k} b_k(t). \quad (2)$$

Waveform continuity including N derivatives is then enforced at the boundaries of the symbol waveforms to suppress emissions outside the allocated bandwidth. The amplitude and N derivatives of the symbol waveforms are substantially matched between the end point of a preceding symbol waveform $s_{i-1}(t)$ and the beginning point of the guard period waveform $g_i(t)$ as represented below by equation (3):

$$\frac{d^n}{dt_{g,i}^n} g_i(t) \bigg|_{t=0} = \frac{d^n}{dt_{s,i-1}^n} s_{i-1}(t) \bigg|_{t=T_s}. \quad (3)$$

Further, the end of the guard period waveform $g_i(t)$ is substantially matched to the beginning point of the following symbol waveform $s_i(t)$ as represented below by equation (4):

$$\frac{d^n}{dt_{g,i}^n} g_i(t) \bigg|_{t=T_g} = \frac{d^n}{dt_{s,i}^n} s_i(t) \bigg|_{t=0}. \quad (4)$$

Selecting a set of guard period basis waveforms that is substantially identical to the set of symbol basis waveforms, truncated to the duration of the guard period, and combining equations (1-4) leads to equation (5):

$$\sum_{k \in K} k^n c_i = \sum_{k \in K} k^n d_{i-1} \text{ for } n = 0, 1, \ldots, N, \quad (5)$$

and to equation (6):

$$\sum_{k \in K} k^n c_i e^{j2\pi k \frac{T_g}{T_s}} = \sum_{k \in K} k^n d_i \text{ for } n = 0, 1, \ldots, N. \quad (6)$$

Equations (5) and (6) are rewritten as the matrix A in vectorized form as represented below by equation (7). One column in the matrix A corresponds to one set of derivatives from 0 to Nth order. The $0^{th}$ order derivative corresponds to the amplitude of the symbol waveform.

$$A = \begin{bmatrix} 1 & 1 & \ldots & 1 \\ k_0 & k_1 & \ldots & k_{K-1} \\ \ldots & \ldots & \ldots & \ldots \\ k_0^N & k_1^N & \ldots & k_{K-1}^N \end{bmatrix} \quad (7)$$

A guard period waveform at the start of a guard period substantially matches the previous symbol waveform at the end point of its period, which is substantially identical to its start due to the periodicity of the symbol. A guard period waveform at the end of a guard period substantially matches the beginning point of the following symbol waveform, one row per derivative, which is 2N+2 rows in total, including the $0^{th}$ order derivative:

$$Mc = \begin{bmatrix} Ad_{i-1} \\ Ad_i \end{bmatrix} \quad (8)$$

with $$M = \begin{bmatrix} A \\ \Phi A \end{bmatrix}.$$

Typically, K>>2N+2, and therefore the equation system (8) is underdetermined. A solution for a vector of guard period basis waveform weighting coefficients $c_1$ that reduces (e.g., minimizes), for example, a sum-of-squared guard period basis waveform weighting coefficients $\|c_i\|$ can be found via the Moore-Penrose pseudoinverse of M, written as $M^\dagger$ as represented below by equation (9):

$$c_i = M^\dagger \begin{bmatrix} Ad_{i-1} \\ Ad_i \end{bmatrix}. \quad (9)$$

Note that the individual guard period basis waveforms in equation (2) are not periodic over the duration of the guard period and are therefore nonorthogonal. As a consequence, reducing (e.g., minimizing) the sum-of-squared guard period basis waveform weighting coefficients $\|c_i\|$ does not strictly reduce (e.g., minimize) signal energy $e_g$ in the guard period waveform, where signal energy $e_g$, for example, can be represented by equation (10):

$$e_g = \int_0^{T_g} |g_i(t)|^2 dt. \quad (10)$$

Processes to reduce (e.g., minimize) a magnitude metric (e.g., a sum-of-squared guard period basis waveform weighting coefficients) $\|c_i\|$ are well known in the art, and will not be described here in the interest of brevity.

However, the resulting solution is attractive as a suboptimal solution because it allows computationally efficient synthesis of guard period waveform $g_i(t)$ using an inverse discrete Fourier transform ("IDFT"), sharing the reconstruction filter employed for symbol generation. Thus, a guard period waveform $g_i(t)$ is calculated for guard period $g_i$ for symbol waveform $s_i(t)$ that achieves amplitude continuity in the waveform and its N derivatives with adjacent symbols on either side thereof.

Turning now to FIG. 7, illustrated is a graphical representation of exemplary waveforms (e.g., OFDM waveforms) according to the principles of the present invention. As illustrated in FIG. 7, a sequence of symbol waveforms $s_{i-1}(t)$, $s_i(t)$, $s_{i+1}(t)$ are separated or bounded by guard period waveforms $g_{i-1}(t)$ (not shown), $g_i(t)$, $g_{i+1}(t)$ and include a leading cyclic prefix. The substantial discontinuities in amplitude of the waveform at borders between any two segments (such as at the border between the symbol waveform $s_{i-1}(t)$ and the guard period waveform $g_i(t)$) are no longer present as a consequence of substantially matching amplitudes and N derivatives of the guard period waveform that is inserted between the previous symbol waveform $s_{i-1}(t)$ and the following symbol waveform $s_i(t)$. In particular, the amplitude and N derivatives at the first end of the guard period waveform $g_i(t)$ substantially match the amplitude and N derivatives at the end point of the previous symbol waveform $s_{i-1}(t)$. The amplitude and N derivatives at the second end of the guard period waveform $g_i(t)$ substantially match the amplitude and N derivatives of the beginning point following symbol waveform $s_i(t)$. Substantial matching of amplitudes and derivatives to achieve amplitude and derivative continuity substantially removes the unwanted emissions in question.

In accordance with a communication element 510 (see, e.g., FIG. 5) embodied in, for instance, a user equipment or base station, in one aspect a controller 525 (in accordance with memory 550) is configured to insert a guard period waveform as set forth herein. An amplitude and a first set of derivatives are determined at an end point of a first symbol waveform (e.g., a symbol waveform $s_{i-1}(t)$). An amplitude and a second set of derivatives are determined at a beginning point of a second symbol waveform (e.g., a symbol waveform $s_i(t)$). A guard period waveform is then determined by weighting and adding guard period basis waveforms, based on the amplitude and a first set of symbol derivatives at the end point of the first symbol waveform and the amplitude and a second set of symbol derivatives at the beginning point of the second symbol waveform. The guard period waveform is then inserted in time between the first and second symbol waveforms. Thus, to insert the guard period waveform, the guard period waveform has an amplitude and set of derivatives at a first end that substantially match the amplitude and first set of derivatives at the end point of the first symbol waveform and an amplitude and set of derivatives at a second end that substantially match the amplitude and second set of derivatives at the beginning point of the second symbol waveform. Determining a guard period waveform by weighting and adding guard period basis waveforms can be understood to indicate the operation of reducing (e.g., minimizing) a cost function. The cost function can be a sum-of-squared guard period basis waveform weighting factors or, alternatively, the cost function can be a measure of energy of the guard period waveform.

Figure 8:
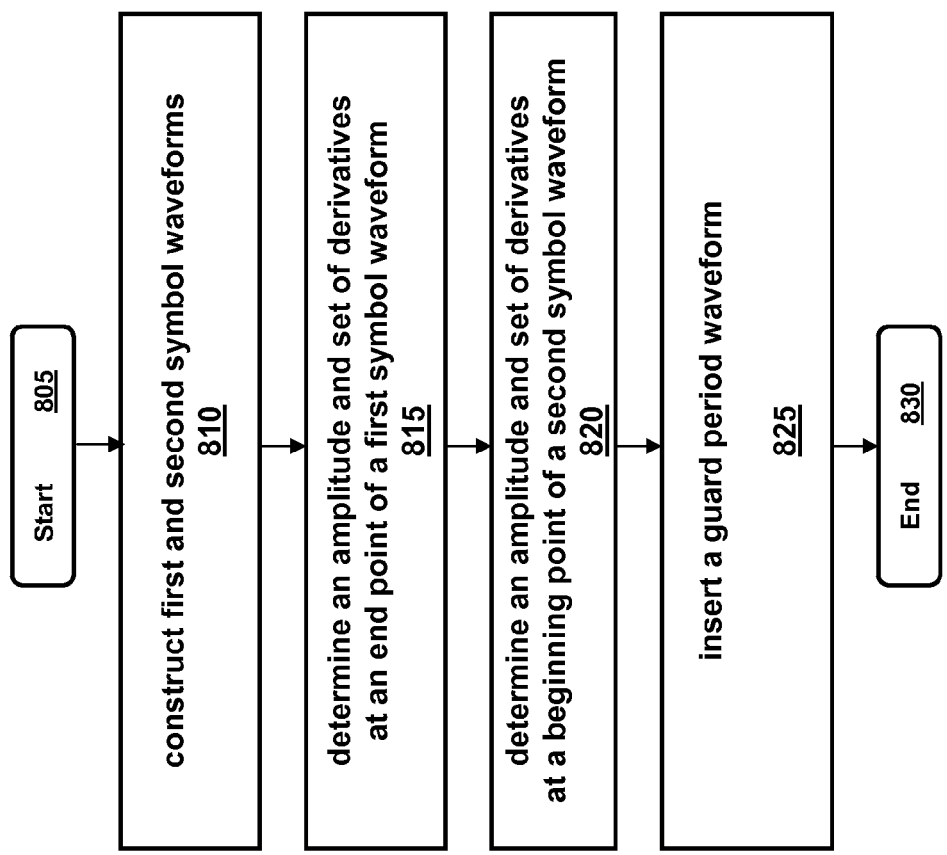
FIG. 8 illustrates a flow diagram of an embodiment of a method for inserting a guard period waveform between first and second symbol waveforms according to the principles of the present invention.

Turning now to FIG. 8, illustrated is a flow diagram of an embodiment of a method for inserting a guard period waveform between first and second symbol waveforms according to the principles of the present invention. The method may be operable in a processor of a communication element (see, e.g., FIG. 5) of a communication system. The method begins in a step or module 805 and proceeds to a step or module 810 wherein first and second symbol waveforms may be constructed from, for instance, a set of symbol basis waveforms scaled by a set of weighting coefficients, and in accordance with an IFFT in an OFDM or SC-FDMA communication system.

In a step or module 815, the method determines an amplitude and a set of derivatives at an end point of a first symbol waveform. In a step or module 820, the method determines an amplitude and set of derivatives at a beginning point of a second symbol waveform. In a step or module 825, the method inserts a guard period waveform having an amplitude and set of derivatives at a first end that substantially matches the amplitude and set of derivatives at the end point of the first symbol waveform, and an amplitude and set of derivatives at a second end that substantially matches the amplitude and set of derivatives at the beginning point of the second symbol waveform.

The guard period waveform may be constructed from a set of guard period basis waveforms scaled by a set of weighting coefficients. The weighting coefficients may be selected according to a sum-of-squares metric, and the weighting coefficients may be determined by solving an underdetermined linear equation system. Alternatively, the set of weighting coefficients can be selected to reduce signal energy in the guard period waveform, or can be selected according to a cost measure dependent on the set of weighting coefficients. The selection of the weighting coefficients can minimize or provide a substantially reduced value for the cost measure. The method ends at step or module 830.

Thus, in an embodiment, the symbol waveform and its derivatives are evaluated at both ends where the symbol waveform touches an adjacent guard period waveform. The guard period waveform and derivatives are determined at both ends of the adjacent guard period waveform. A system of linear equations is set up so that symbol waveform amplitudes and its derivatives substantially match at both ends of the adjacent guard period waveform. A least-squares solution is evaluated, resulting in a vector of guard period basis waveform weighting coefficients. The guard period basis waveforms are scaled with the respective weighting coefficient and added. The resulting signal is inserted into the guard period. Equation (9) is employed to produce the set of weighting coefficients described hereinabove.

Exemplary simulations were performed using an OFDM signal that largely resembles the five megahertz mode in a LTE-based communication system (see, e.g., 3GPP TS 36.211 v.9.0.0 (2009-12), which is incorporated herein by reference). The cyclic prefix was replaced with a guard period with a length of eight percent of the symbol waveform. Simulation parameters are shown below in Table I.

TABLE I

| Simulation Parameters | |
| --- | --- |
| simulated number of symbols | 300 |
| number of symbol basis waveforms (subcarriers), a number of elements in K | 301 |
| subcarrier basis waveform spacing | 15 kilohertz ("kHz") |
| modulation | 64 quadrature amplitude modulation ("QAM") |
| spectrum resolution bandwidth | 30 kHz |

Figure 9:
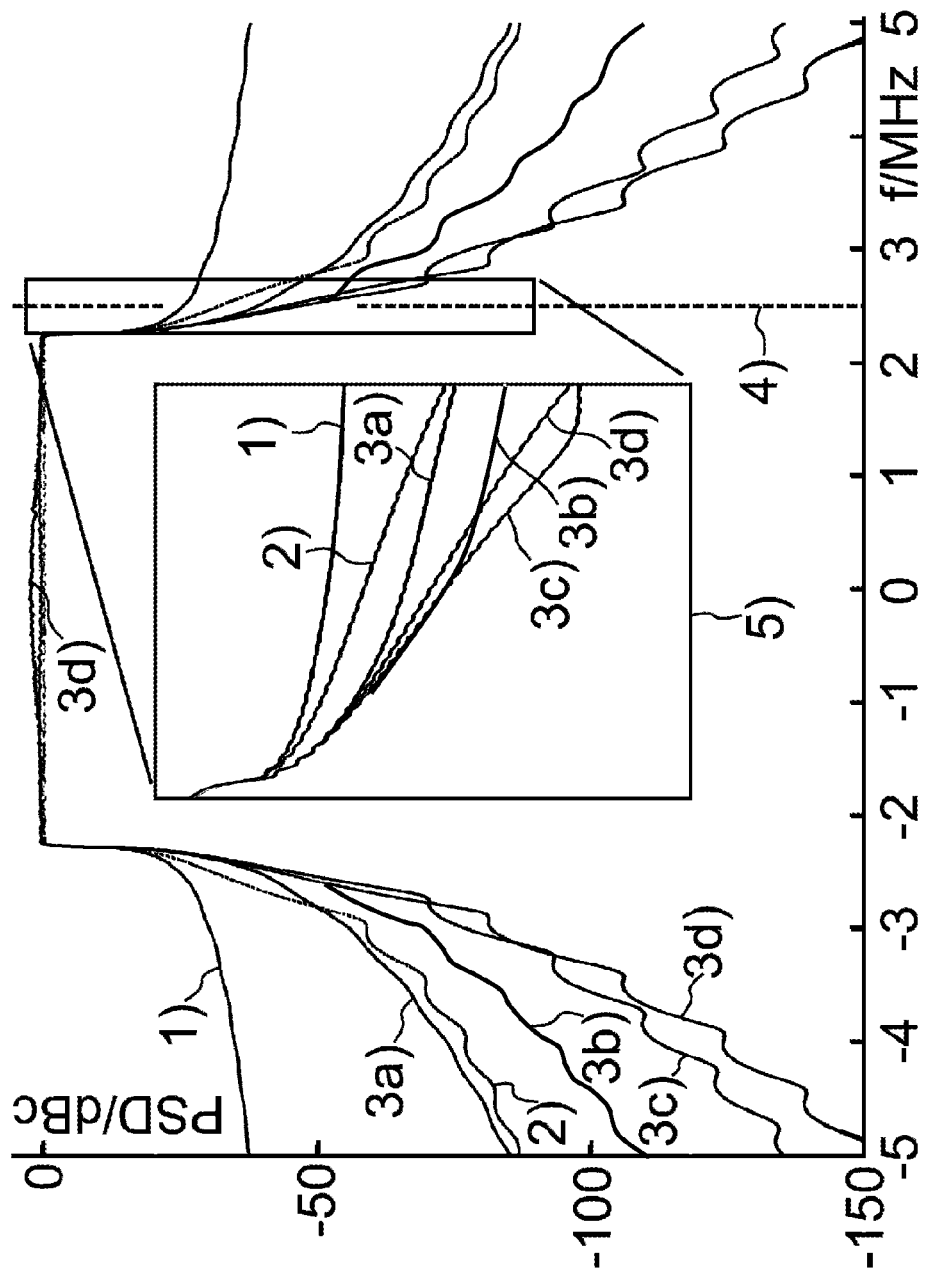
FIG. 9 illustrates a graphical representation of exemplary power spectral densities related to guard periods demonstrating the principles of the present invention.

Turning now to FIG. 9, illustrated is a graphical representation of exemplary power spectral densities ("PSD") related to guard periods demonstrating the principles of the present invention. The simulated guard period was set to eight percent of the symbol waveform. Trace 1 represents a power spectrum for an OFDM signal with blank guard periods. The signal in trace 2 uses conventional raised-cosine windowing over the full length of the guard period. In traces 3a to 3d, the guard period waveform was generated using equations (2) to (9) for a variable number of continuous derivatives N (e.g., for trace 3b, N=5). The unwanted emissions from the N-continuous derivative tend to decay faster than the windowed signal at higher frequency offsets.

A main challenge for a communication device is to limit emissions on frequencies close to the transmitted signal. Line 4 in FIG. 9 denotes the edge of a five megahertz ("MHz") communication channel in a LTE-based communication system, and the spectrum is magnified in inset 5. For an allocated bandwidth of 2.25 MHz, signal energy on the right side of inset 5 will interfere with a neighboring communication channel. It can be seen in FIG. 9 that continuous derivative results outperform windowing. Both the OFDM signal and the guard period waveform are processed with a power amplifier (e.g., in a transmitter of a transceiver) that imposes limitations with regard to high instantaneous transmitter power. Therefore, it is desirable that above-average instantaneous transmitter power in the guard period waveform is less likely than in the OFDM signal.

Figure 10:
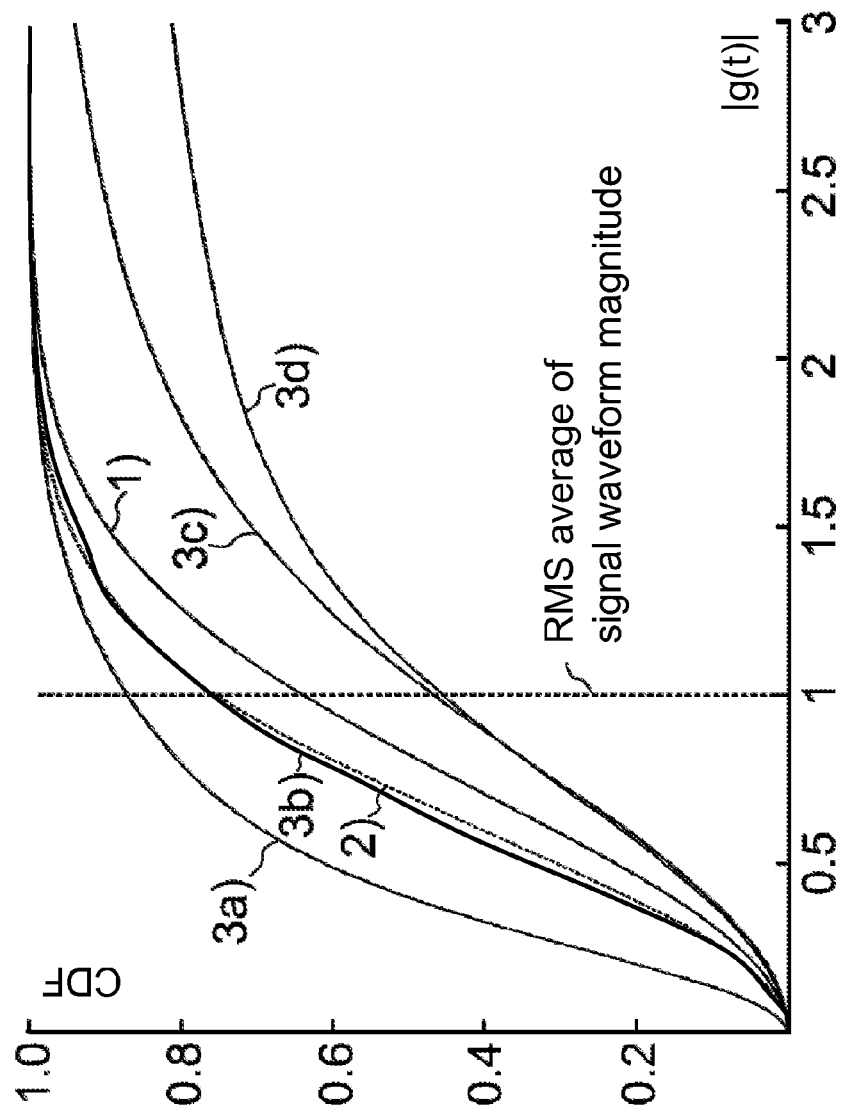
FIG. 10 illustrates a graphical representation of the cumulative amplitude density function of an exemplary guard period waveform according to the principles of the present invention.

Turning now to FIG. 10, illustrated is a graphical representation of the cumulative amplitude density function ("CDF") of an exemplary guard period waveform g(t) according to the principles of the present invention. FIG. 10 illustrates the guard period waveform from FIG. 9 for a guard period set to eight percent of the symbol waveform. Trace 1 represents the cumulative amplitude density function of the OFDM signal for the symbol waveform. The root mean square ("RMS") average of the OFDM signal magnitude in trace 1 is normalized to 1. Trace 2 represents the cumulative amplitude density function of the raised cosine-windowed guard period. Traces 3a to 3d represent the cumulative amplitude density function of the transmitted signal for N=3, 5, 8, 11 continuous derivatives, respectively, across the symbol-guard period boundary.

Trace 1 of the OFDM signal for the symbol waveform is also valid for a cyclic-prefixed signal. Trace 2 of FIG. 10 has lower average power than trace 1 since the energy in the raised-cosine window is about 75 percent due to the window shape. In the middle of the window, the power sags by three decibels ("dB"). Trace 1 corresponds to the symbol waveforms and trace 2 to the guard periods of the raised-cosine-windowed OFDM signal from FIG. 9. Comparing trace 3d to trace 1 demonstrates that high transmitter signal amplitudes are less likely in the N=8 continuous-derivative signal, and the signal can be generated with a power amplifier that is dimensioned for a conventional OFDM signal.

The process described herein can advantageously create an improved spectrum quality using a shorter guard period than, for example, raised-cosine windowing. Effectively, less channel capacity is needed to limit spectral emissions, which can result in improved spectral efficiency. The process can be employed in combination with a cyclic prefix (or postfix), when the transmitted signal is modified by inserting a guard period waveform after a symbol waveform, followed by a cyclic prefix, followed by another symbol waveform. In this case, the guard period waveform is substantially matched to the cyclic prefix. With this approach, the cyclic prefix remains substantially free of intersymbol interference ("ISI") and is available to resolve multipath propagation issues. If the delay profile of the communication channel is short (e.g., as in an indoor environment), it can be very short. The cyclic prefix being substantially free of intersymbol interference is beneficial, especially for higher-order modulations (e.g., 64 quadrature amplitude modulation ("QAM"), and maybe even 256 QAM), which may become practical at short-distance links with low transmitter power. The process results in better out-of-band rejection, both near and distant from the band edge. For N=5 continuous derivatives at the symbol-guard waveform boundaries, continuous OFDM outperforms raised-cosine windowing, allowing shorter guard periods or bands to achieve the same spectrum quality.

In another aspect for communication systems, orthogonal frequency division multiple access ("OFDMA") is an attractive choice for a multiple access technology to share a common communication channels between many different user equipment. OFDMA is especially attractive in applications that employ flexible spectrum use, optimized local area networks, and possibly future cognitive radio communication systems. Interference is substantially avoided by each user equipment choosing (or being assigned) frequency bands that are not used by any nearby communication node or user equipment.

OFDM symbols for transmission are concatenated in time and the resulting signal is separated from a following signal by a leading cyclic prefix ("CP") or a trailing cyclic postfix. For an unfiltered OFDM signal waveform, the baseband waveform exhibits random discontinuities between any two adjacent symbols. A synchronized communication device discards discontinuities in amplitude and derivatives between adjacent symbol waveforms and the spectrum appears confined to the frequency range of the subcarriers that are utilized. Discontinuities between symbol waveforms cause spectral leakage into adjacent frequencies to a nonsynchronized communication device and thus produce interference to such nonsynchronized communication device. Interference caused by such discontinuities in nonsynchronized communication devices is generally referred to as "sinc" leakage, referring to the loss of synchronization. The communication devices attempt to synchronize to a received signal to an accuracy within a cyclic prefix length, resulting in orthogonality between signals from different sources at a communication device.

Figure 11:
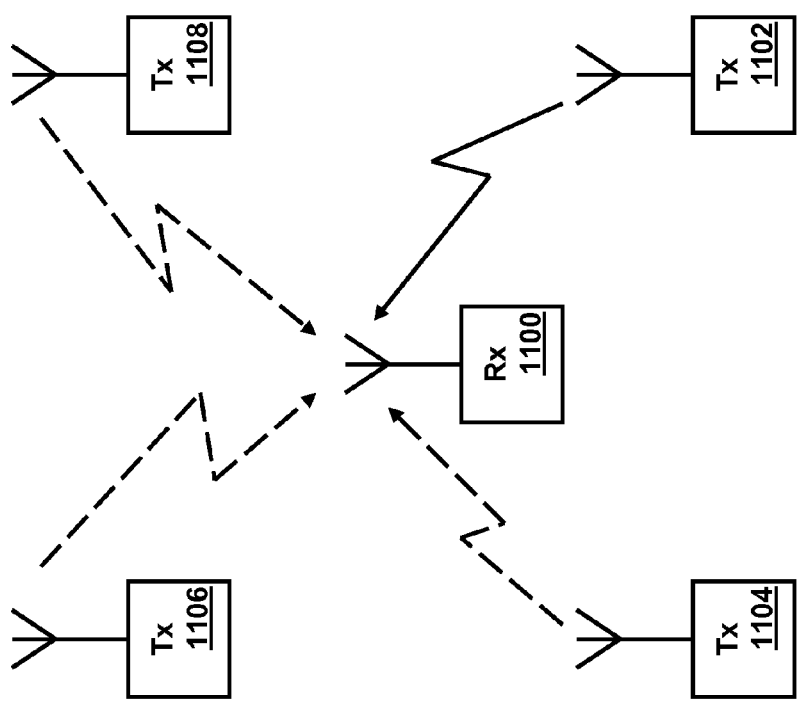
FIG. 11 illustrates a system level diagram of an embodiment of a communication system including communication devices that provides an environment for application of the principles of the present invention.

Turning now to FIG. 11, illustrated is a system level diagram of an embodiment of a communication system including communication devices (e.g., user equipment) 1100, 1102, 1104, 1106, 1108 that provides an environment for application of the principles of the present invention. OFDMA using block allocation assigns different communication devices a different set of subcarriers in subbands. Orthogonality at a communication device such as a receiving communication device 1100 is preserved as long as the received signals are time-aligned within one cyclic prefix length.

While it is desirable to synchronize all communication devices, it is questionable whether or not it is realistic to expect synchronization at all communication devices with the required accuracy under all circumstances. The quoted cyclic prefix length needs to be sufficient for path length differences between receiving communication devices and interfering communication devices, multipath propagation, time dispersion caused by filtering in the frontends of transceivers of the communication devices, and synchronization error. A communication system requires robustness towards synchronization errors exceeding the cyclic prefix length.

By allowing half the cyclic prefix length in a budget for synchronization error, one arrives at an accuracy requirement at a communication device of about 0.3 µs. If the error is Gaussian distributed, one might ask for another factor of two (about 0.15 µs) also to cover the tails of the distribution. While a final accuracy is an ongoing issue and challenge, it can be seen that synchronization for OFDMA is a non-trivial problem. The communication system should be sufficiently robust to operate with "bad" synchronization, if only for the exchange of synchronization messages.

Figure 12:
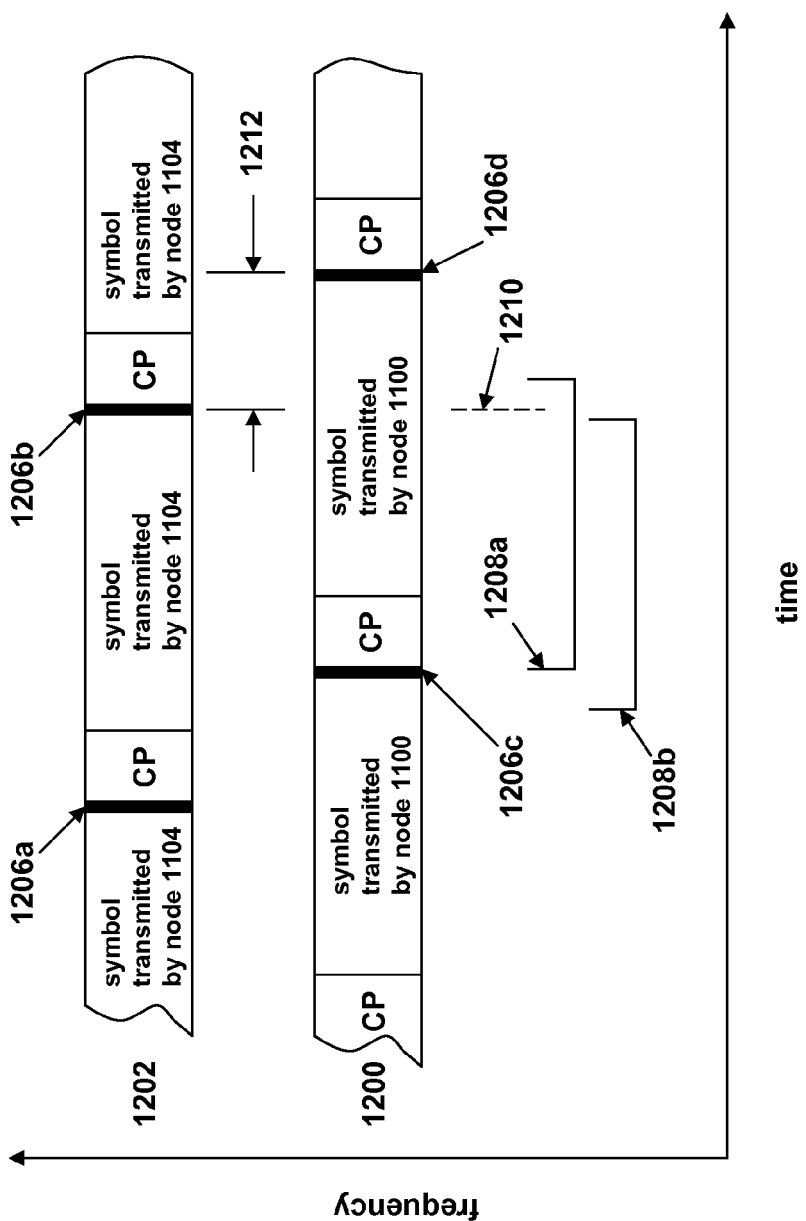
FIG. 12 illustrates a diagram of an exemplary signal received at a communication device according to the principles of the present invention.

Turning next to FIG. 12, illustrated is a diagram of an exemplary signal received at a communication device according to the principles of the present invention. A wanted signal 1200 occupies one frequency band (a set of subcarriers), and an unwanted signal 1202 occupies another frequency band (a set of subcarriers). Time is represented along the horizontal axis and frequency along the vertical axis of the FIGURE. Each OFDM symbol is preceded by a cyclic prefix that redundantly replicates part of the symbol. Between each symbol and the cyclic prefix of the following symbol the signal contains a discontinuity of random amplitude and phase indicated by bold lines 1206a, 1206b, 1206c, 1206d. A communication device uses a time window such as time windows 1208a, 1208b in which to process of a received signal. If the discontinuity falls outside the communication device's time window, the time window is properly synchronized with the respective transmission to avoid interference.

In FIG. 12, the time offset 1212 between the wanted and unwanted signals 1200, 1202 exceeds the cyclic prefix length, which may occur as a result of synchronization error between communication devices or nodes (such as communication devices 1100, 1104 of FIG. 11). Two examples for communication device time windows are shown in FIG. 12. Time window 1208a is synchronized with the wanted signal 1200, but captures the discontinuity of the interfering signal at time instant 1210. Time window 1208b is synchronized to the unwanted signal 1202, but includes part of the preceding symbol. In either case, a deterioration of the wanted signal 1200 results, either by intersymbol interference ("ISI") or by sinc leakage.

Conventionally, OFDM (and SC-FDMA) communication devices are synchronized to the wanted signal (e.g., time window 1208b). For a synchronized communication device, a signal is ideally confined to the set of assigned subcarriers. It may be prohibitively difficult, however, especially in unlicensed bands, to synchronize the communication devices, particularly communication devices belonging to different communication systems or networks. Thus, it would be advantageous to remove sinc leakage, at least partly at the communication device where it originates.

There are a number of conventional techniques for reducing out-of-band emissions due to sinc leakage at a communication device such as filtering implemented in a LTE-based uplink communication device on a similar SC-FDMA signal. Other techniques include windowing (or smoothly "fading" each symbol into the following symbol) or subcarrier cancellation. Another technique includes N-continuous OFDM, which refers to forcing N derivatives of a baseband waveform to be continuous across the border between symbols as described by the reference entitled "N-continuous OFDM," by van de Beek, et al., cited above. Another technique includes precoding before OFDM in combination with N-continuous OFDM, which is a technique similar to the technique disclosed in the reference entitled "EVM-Constrained OFDM Precoding for Reduction of out of Band Emission," by van de Beek, et al, cited above. Yet another technique includes selective mapping of constellations of the symbols in OFDM for reduction of a peak-to-average ratio of the transmitted signal (not necessarily suppression of sinc leakage). The aforementioned technique chooses one out of N symbols with substantially identical information content that gives the best peak-to-average ("PAR") power ratio of the signal.

Yet another technique is selective mapping of constellations of symbols in combination with N-continuous OFDM, which can be used before precoding (as in selective mapping in OFDM for peak-to-average ratio reduction). In yet other techniques, reduction of out-of-band radiation in OFDM-based overlay systems, which includes subcarrier cancellation and windowing, and sidelobe suppression for OFDM-based cognitive communication systems in dynamic spectrum access communication networks (cancellation of subcarriers with constellation expansion). The final technique is a selective mapping technique that chooses between alternative constellation points. The known techniques for reducing out-of-band emissions have various disadvantages such as occupying extra transmit time, consuming extra bandwidth and transmit power, and causing intersymbol interference or signal distortion.

As introduced herein, a position in the time domain waveform of an OFDM symbol is determined that reduces (e.g., minimizes) the discontinuity between the end point of the first (previous) symbol waveform and the beginning point of a second (following) symbol waveform. The determined position (or point) has waveform amplitude that substantially matches the amplitude of the end point of the first symbol waveform. The second symbol waveform is transmitted starting from the determined position (or point) by appending (wrapping) the beginning portion of the second symbol waveform to an end thereof, including generation of a cyclic prefix (or postfix). In other words, the beginning portion of the second symbol waveform is removed and then appended to an end thereof, thereby "reordering" the second symbol waveform.

Figure 13:
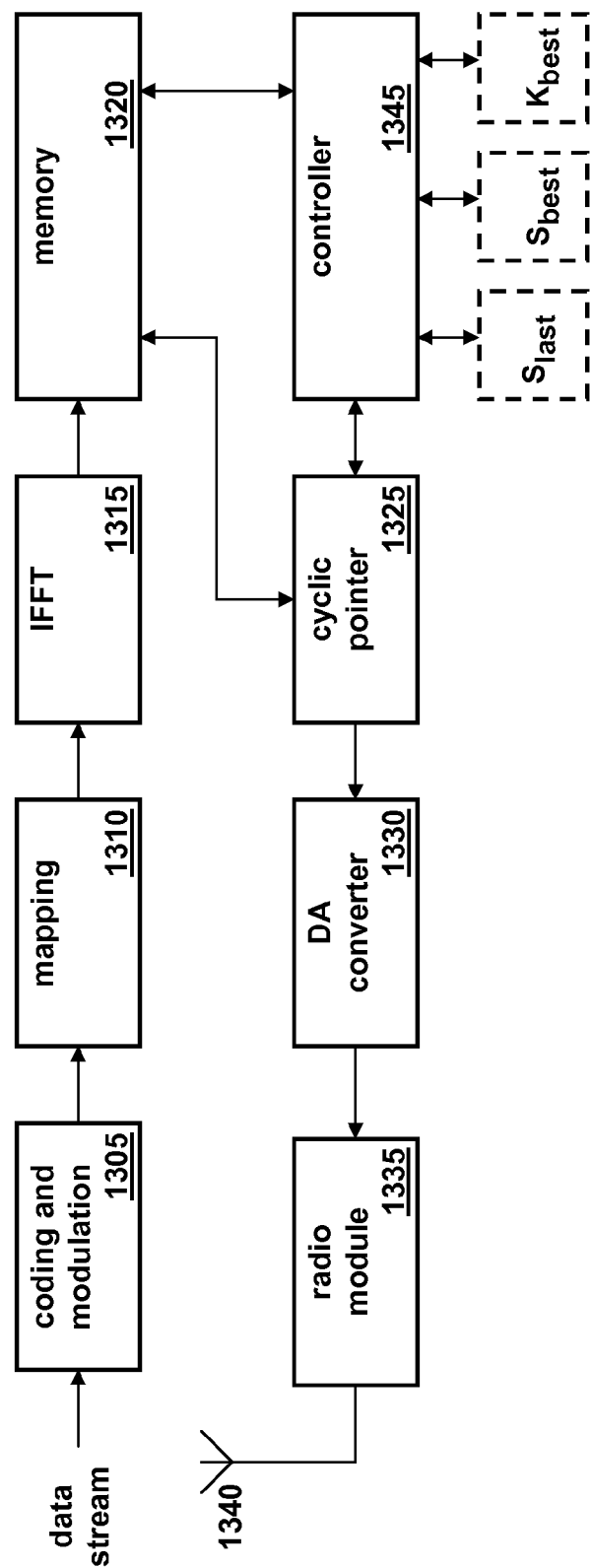
FIG. 13 illustrates a system level diagram of an embodiment of a communication element, or portions thereof, of a communication system for application of the principles of the present invention.

Turning now to FIG. 13, illustrated is a system level diagram of an embodiment of a communication element or device, or portions thereof, of a communication system for application of the principles of the present invention. A coding and modulation module 1305 encodes a data stream by, for example, applying a ⅓ turbo code, wherein three bits are transmitted for one data bit, and modulates the data stream using, for example, quadrature phase shift keying ("QPSK") modulation to produce complex constellations for bit sequences.

The resulting modulated and coded signal is mapped as complex constellations, each constellation representing a bit sequence of source information, to subcarriers by a mapping module 1310. For example, the communication device may be allowed to utilize a bandwidth spanning 300 subcarriers, while other nearby frequencies remain unused to prevent interference to other communication devices. Additionally, zero subcarriers (i.e., subcarriers with zero amplitude) are inserted as guard bands at both ends of the spectrum for the communication device. The total number of subcarriers (allocated and non-allocated subcarriers including guard bands) provided to IFFT module 1315 may be 2048.

The IFFT module 1315 generates a time-domain symbol from the subcarriers. The symbol may comprise 2048 samples. The time domain symbol is stored in memory 1320. A cyclic pointer 1325 indexes the memory 1320 and provides a first sample (a complex constellation) of the cyclic prefix (or postfix) to digital-to-analog ("DA") converter 1330. The cyclic pointer 1325 then proceeds to the next sample, and so on. Once the cyclic pointer 1325 reaches a position that exceeds the size of the memory 1320, it resets to the first constellation sample in the memory 1320 and continues from there, until a number of constellation samples corresponding to the loop length has been generated.

The position of cyclic pointer 1325 may be initialized using a predetermined cyclic prefix length. For example, given a memory size of 2048 samples and a cyclic prefix length of 100 samples, it may be initialized to point, for example, at sample number "1949" to produce a cyclic prefix of length 2048−1948=100. Further, the loop length of cyclic pointer 1325 is set to the memory size plus the cyclic prefix length, 2048+100=2148 samples in this example.

The digital-to-analog converter 1330 constructs a time-domain waveform corresponding to the constellation samples and transmits the same via a radio module (or frontend) 1335 and an antenna 1340 for transmission. After transmitting a first symbol (or first symbol waveform), new data from data stream is input to coding and modulation module 1305, and the process repeats. The communication device structure may suffer from sinc leakage, unless an effort is made to limit the discontinuity between any two adjacent symbols (or symbol waveforms).

Figure 14:
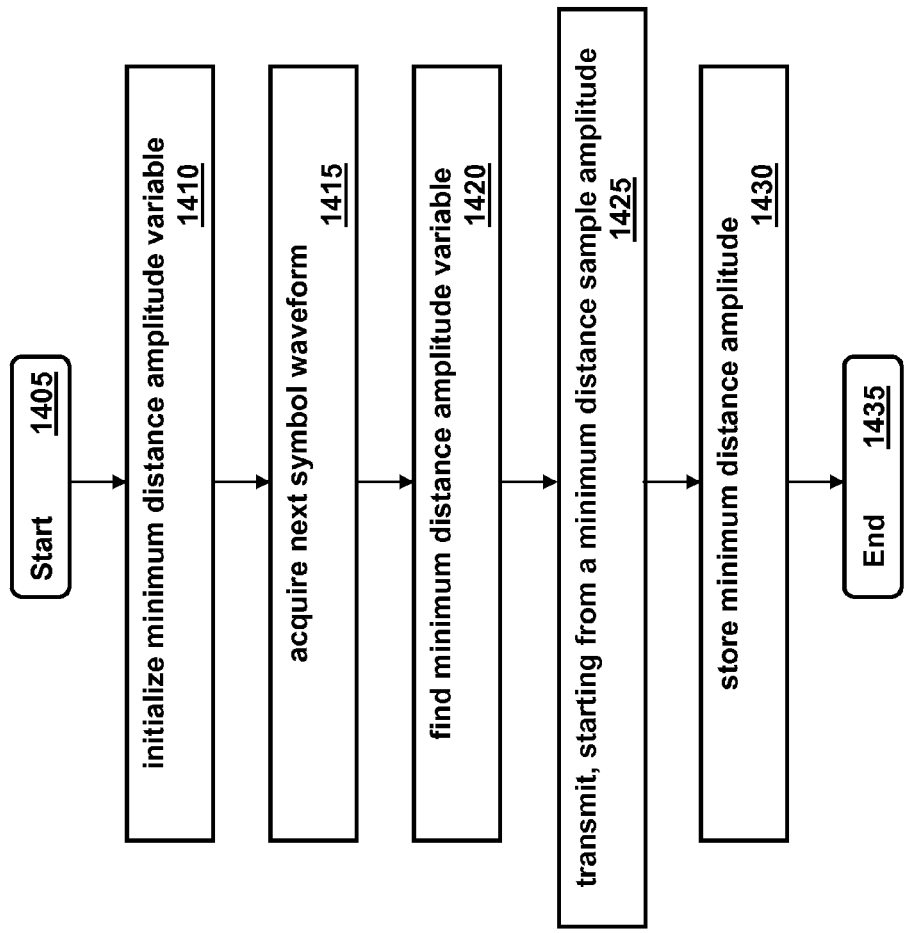
FIG. 14 illustrates a flow diagram of an embodiment of a method for processing symbols in accordance with the principles of the present invention.

In addition to performing various management and control functions within the communication device, a controller 1345 is constructed to perform the following method as described concurrently with respect to FIG. 14. As introduced herein, a first symbol (or symbol waveform) is transmitted as described hereinabove. The controller 1345 stores the amplitude $S_{last}$ of the end point of the first symbol waveform provided to the digital-to-analog converter 1330. The controller 1345 initializes an amplitude variable $S_{best}$ to a very large value that is greater than any possible amplitude produced by the IFFT module 1315, which corresponds to a step or module 1410 designated "initialize minimum distance amplitude variable" following the start step 1405.

New data from the data stream is coded and modulated in the coding and modulation module 1305, mapped to subcarriers in the mapping module 1310, converted to a time domain waveform in the IFFT module 1315, and written to memory 1320, which corresponds to step or module 1415 designated "acquire next symbol waveform." The controller 1345 indexes every sample amplitude $S_{indexed}$ along the next (or second) symbol waveform in memory 1320 starting at an indexed location $K_{indexed}$, determines a first difference between the amplitude variable $S_{best}$ and the amplitude $S_{last}$ of the end point of the first symbol waveform, and a second difference between the sample amplitude $S_{indexed}$ and the amplitude $S_{last}$ of the end point of the first symbol waveform. A difference d between two complex-valued samples "a" and "b" may be determined as the magnitude d=|a−b|. If the second difference is smaller than the first difference, the controller 1345 sets the amplitude variable $S_{best}$ (and the corresponding index location $K_{best}$) to the sample amplitude $S_{Indexed}$ (and the corresponding index location $K_{indexed}$), which corresponds to step or block 1420 designated "find minimum distance amplitude variable."

After indexing all sample amplitudes in memory 1320, the controller 1345 initializes the cyclic pointer 1325 to the index location $K_{best}$. In other words, generation of the next symbol waveform advantageously starts at the sample amplitude $S_{indexed}$ that has the smallest difference with the amplitude $S_{last}$ of the end point of the first symbol waveform. In accordance therewith, the controller appends the beginning portion of the next symbol waveform before the sample amplitude $S_{indexed}$ at the end point thereof. Transmission of the OFDM symbol (and its cyclic prefix extension) commences, which corresponds to step or block 1425 designated "transmit, starting from minimum distance sample amplitude." Finally, the controller 1345 stores the amplitude of the end point of the next symbol waveform as amplitude $S_{last}$, which corresponds to step or module 1430 designated "store minimum distance amplitude" and the method ends at step 1435.

In an embodiment that advantageously results in a reduced processing effort, the controller 1345 may index a subset of memory locations from memory 1320. For example, the controller 1345 may stop updating index location $K_{best}$ after processing 100 samples (out of 2048), and proceed to transmitting the symbol waveforms. While the performance may be compromised, the worst discontinuities are avoided. It is recalled that energy in a signal scales with the square of its magnitude. Therefore, even a small improvement translates into a considerable reduction in sinc leakage.

In another embodiment, advantageously resulting in a reduced processing effort, controller 1345 stops indexing the memory 1320 as soon as an indexed sample amplitude is found where the magnitude of the second difference $|S_{indexed}-S_{last}|$ is less than a threshold level. The threshold level can be a predetermined threshold level. This may achieve a given sinc leakage suppression with a reduced computational effort, thus conserving battery capacity in a communication device.

Figure 15:
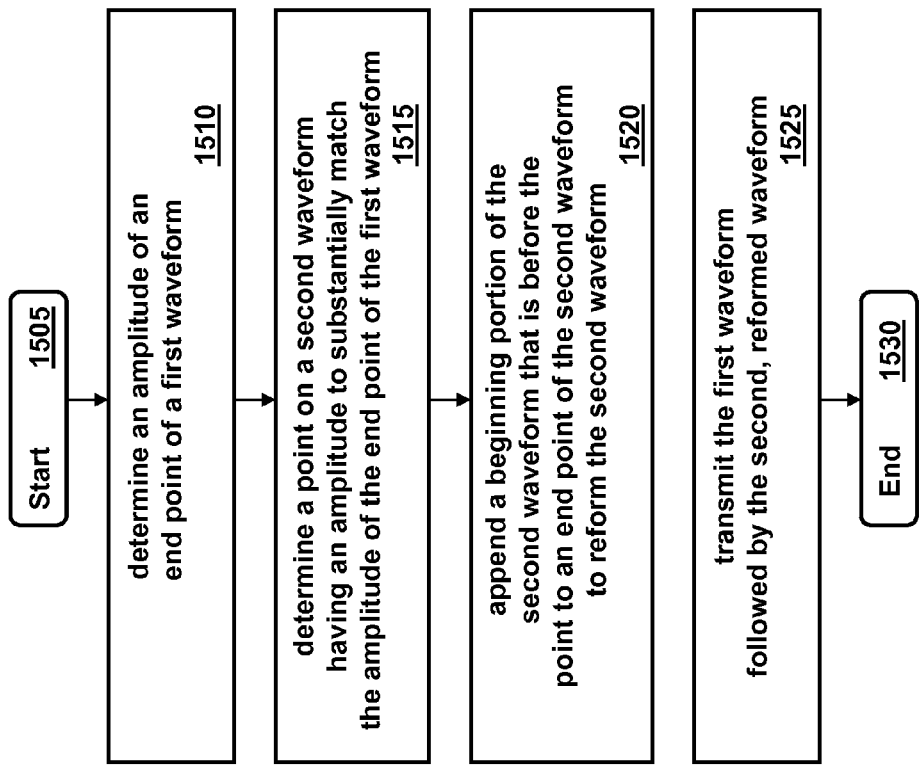
FIG. 15 illustrates a flow diagram of an embodiment of a method for appending a beginning portion of a second waveform to an end point of a first waveform according to the principles of the present invention.

Turning now to FIG. 15, illustrated is a flow diagram of an embodiment of a method for appending a beginning portion of a second waveform to an end point of a first waveform according to the principles of the present invention. The method may be operable in a processor of a communication element (see, e.g., FIGS. 5 and/or 13) of a communication system. The method begins in a step or module 1505 and proceeds to a step or module 1510 wherein the method determines an amplitude of an end point of a first waveform. In a step or module 1515, the method determines a point on a second waveform having an amplitude to substantially match the amplitude of the end point of the first waveform. The first and the second waveform can represent a time-domain OFDM or SC-FDMA symbol. The first waveform and the second waveform can be formed with a cyclic prefix or a cyclic postfix. In an embodiment, the method determines the point on the second waveform that reduces (e.g., minimizes) a magnitude of a difference between the amplitude of the end point of the first waveform and the amplitude of the point on the second waveform. In an embodiment, the method determines the point on the second waveform wherein a magnitude of a difference between the amplitude of the end point of the first waveform and the amplitude of the point on the second waveform is less than a threshold level. In an embodiment, the method stores a value of the amplitude of the end point of the first waveform so that the method can determine the point in the second waveform. In an embodiment, the method may examine only a portion of the second waveform to determine the point.

In a step or module 1520, the method appends a beginning portion of the second waveform that is before the point to an end point of the second waveform to re-form the second waveform. Thus, the portion of the second waveform that is after the point is now the first portion of the waveform, and the portion of the second waveform that is before the point is now the second portion of the waveform. In a step or module 1525, the method transmits the first waveform followed by the second, re-formed waveform. The method ends at step or module 1530.

Figure 16:
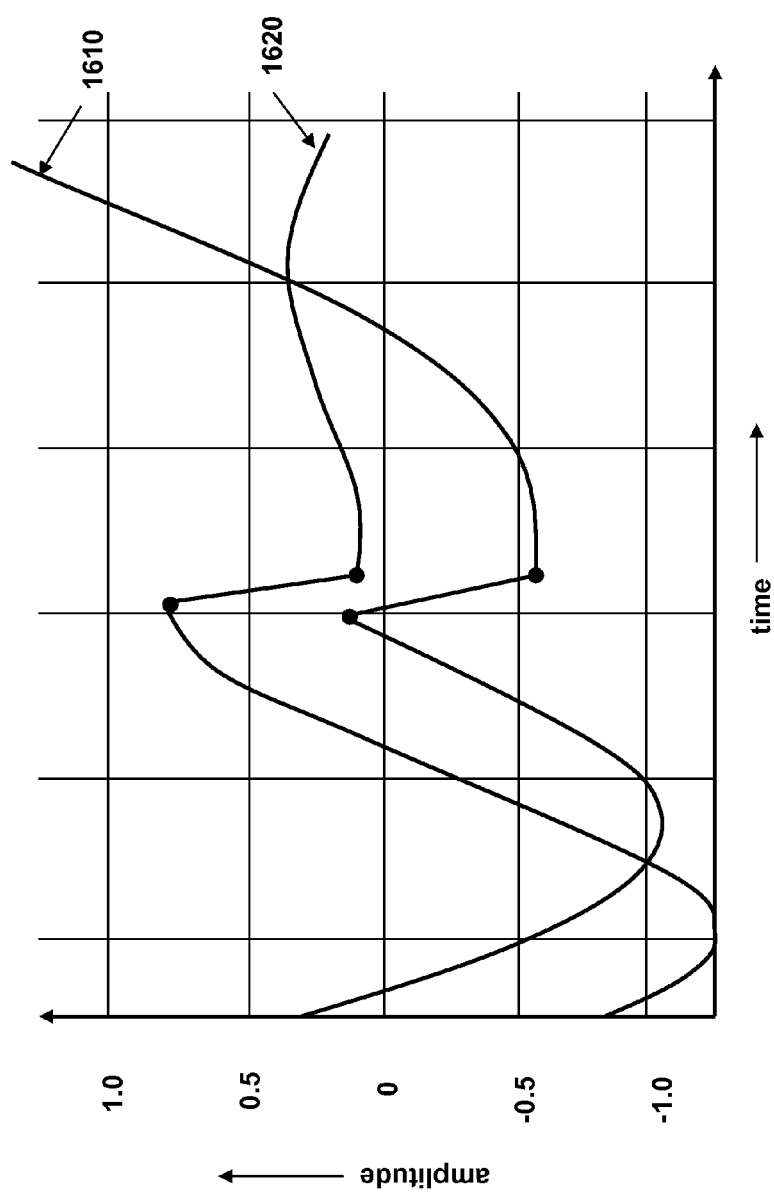
FIG. 16 illustrates a graphical representation of a complex baseband waveform.

Turning now to FIG. 16, illustrated is a graphical representation of complex baseband waveforms. Time is represented along the horizontal axis and signal amplitude along the vertical axis of the FIGURE. A first waveform section 1610 represents the real part of the waveforms and the second waveform section 1620 represents the imaginary part. The heavy dots overlaid on the waveform sections 1610, 1620 denote the last and first constellation amplitudes of two adjacent symbols. The discontinuity in amplitude between two symbol waveforms (the first symbol waveform and cyclic prefix of the second symbol waveform with 4× oversampling) is clearly visible in FIG. 16. The complex baseband waveforms illustrated by the two waveform sections in FIG. 16 are a result of a conventional communication device and corresponds, as an example, to a first waveform section 1910 described hereinbelow with reference to FIG. 19.

Figure 17:
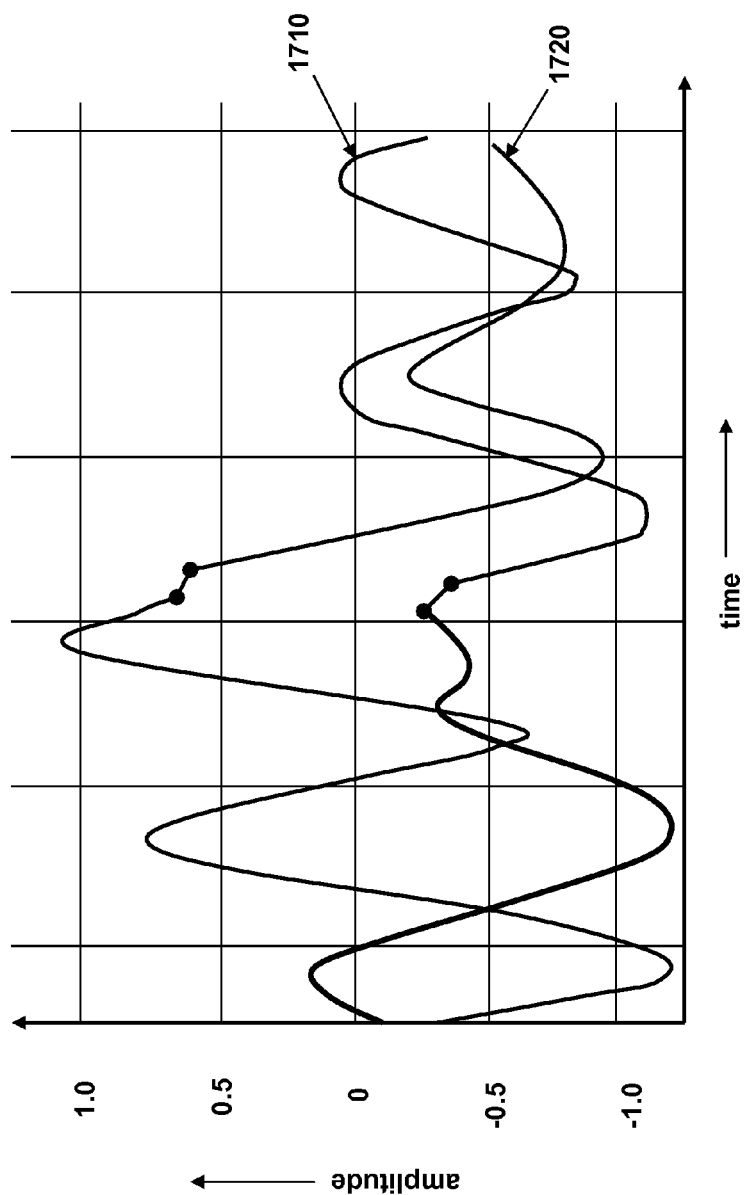
FIG. 17 illustrates a graphical representation of complex baseband waveforms according to the principles of the present invention.

Turning now to FIG. 17, illustrated is a graphical representation of complex baseband waveforms according to the principles of the present invention. Time is represented along the horizontal axis and signal amplitude along the vertical axis of the FIGURE. A first waveform section 1710 represents the real part of the waveforms and the second waveform section 1720 represents the imaginary part. The heavy dots overlaid on the waveform sections 1710, 1720 denote the last and first constellation amplitudes of two adjacent symbols. Compared to FIG. 16, the discontinuity between adjacent symbol waveforms is much smaller, which produces less sinc leakage. It should be noted that while the time scales for FIGS. 16 and 17 may differ, the reduction in the magnitude in discontinuities is clearly illustrated in FIG. 17.

Figure 18:
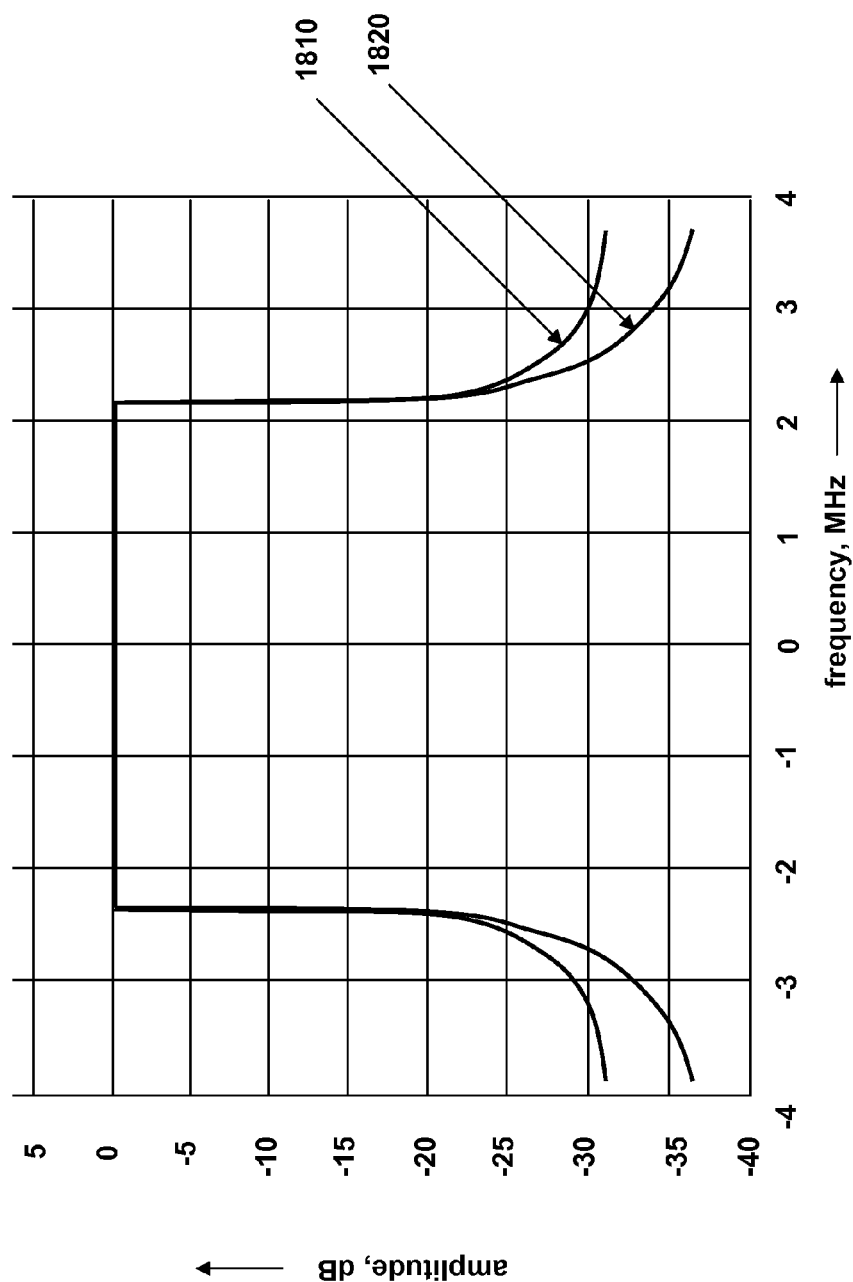
FIGS. 18, 19 and 20 illustrate graphical representations of a reduction in sinc leakage for exemplary symbol waveforms at different oversampling rates according to the principles of the present invention.
Figure 19:
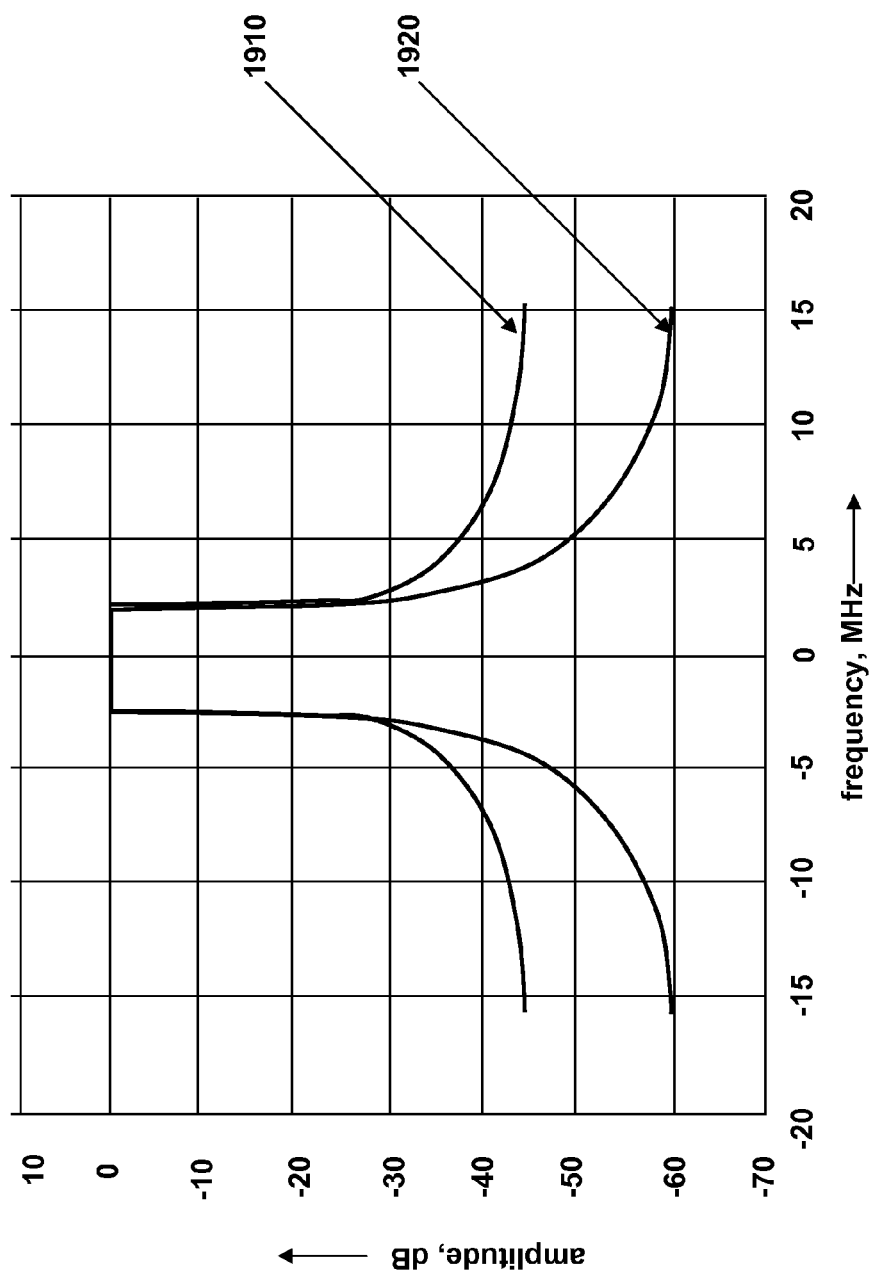
Figure 20:
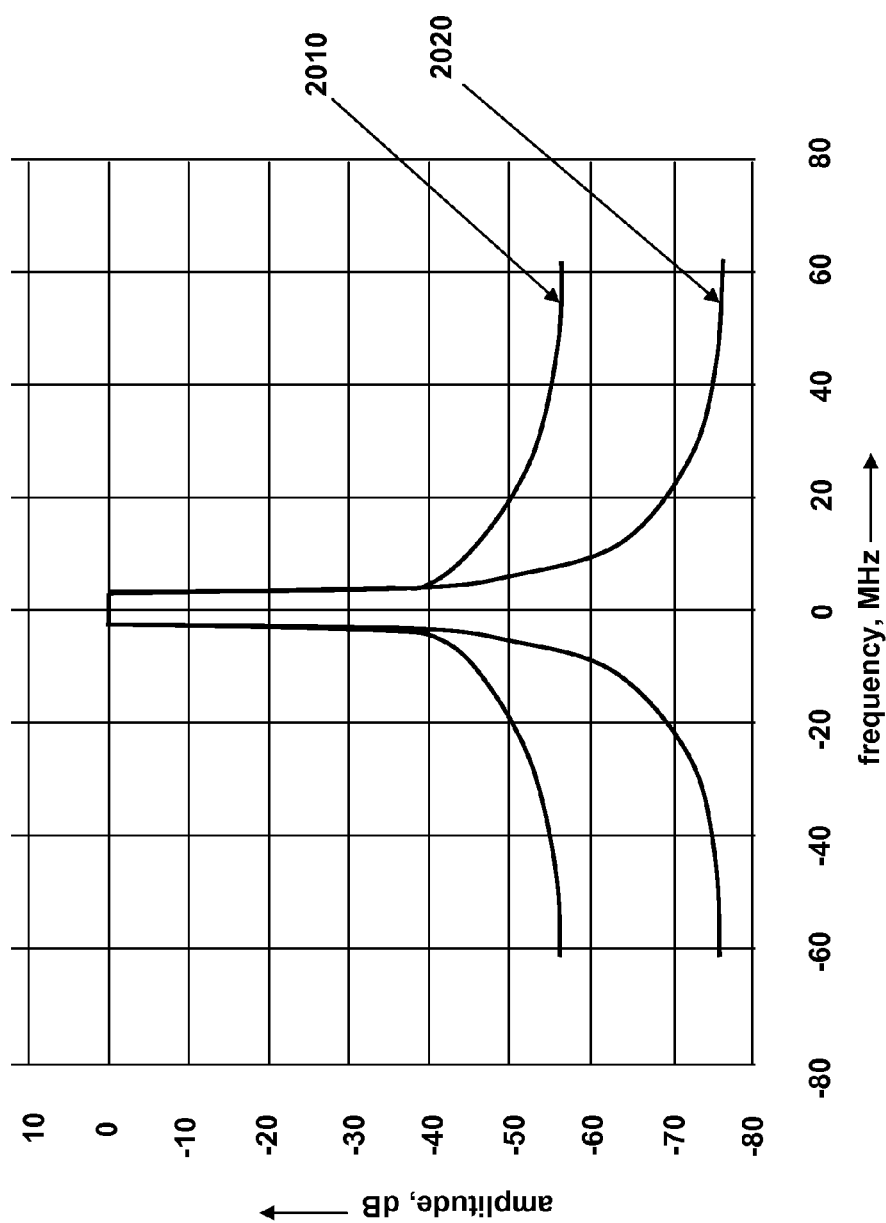

Turning now to FIGS. 18 to 20, illustrated are graphical representations of a reduction in sinc leakage for exemplary symbol waveforms at different oversampling rates according to the principles of the present invention. The vertical axis represents spectrum amplitude, and the horizontal axis represents frequency offset from a carrier in the FIGUREs. In FIG. 18, there is no oversampling, and there are 300 subcarriers in a 512-bin IFFT. In FIG. 19, there is 4× oversampling, and there are 300 subcarriers in a 4×512-bin IFFT. In FIG. 20, there is 16× oversampling, and there are 300 subcarriers in a 16×512-bin IFFT. A first waveform section 1810, 1910, 2010 in FIGS. 18, 19 and 20, respectively, represent transmitted spectra amplitudes associated with the symbol waveforms that do not result from selective mapping of the symbol waveform (i.e., these curves serve as a reference). The second waveform section 1820, 1920, 2020, represent transmitted spectra amplitudes associated with the symbol waveforms that result from selective mapping of the symbol waveform according to the principles of the present invention.

Figure 21:
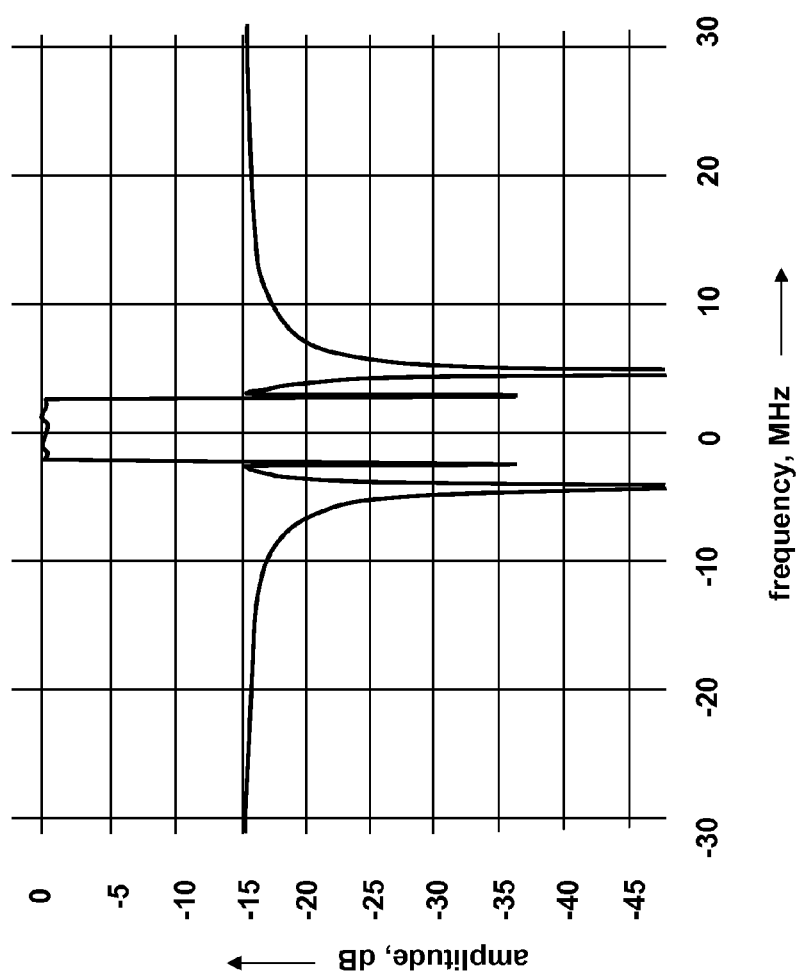
FIGS. 21 and 22 illustrate graphical representations of attenuation performance of exemplary filters.

There is a significant reduction of about 5 to 15 decibels ("dB") in unwanted spectral emissions as illustrated in FIGS. 18, 19 and 20. A high rejection at large frequency offsets can be especially beneficial in combination with digital infinite impulse response ("IIR") filters, which do not necessarily provide a slope inversely linearly proportional to frequency ("1/f"), as is often implicitly assumed for designs based on an analog filter prototype. For example, FIG. 21 illustrates a graphical representation of an exemplary attenuation performance of a fourth-order elliptical IIR filter with a largely flat stopband, where rejection of sinc leakage prior to filtering would be very beneficial.

Figure 22:
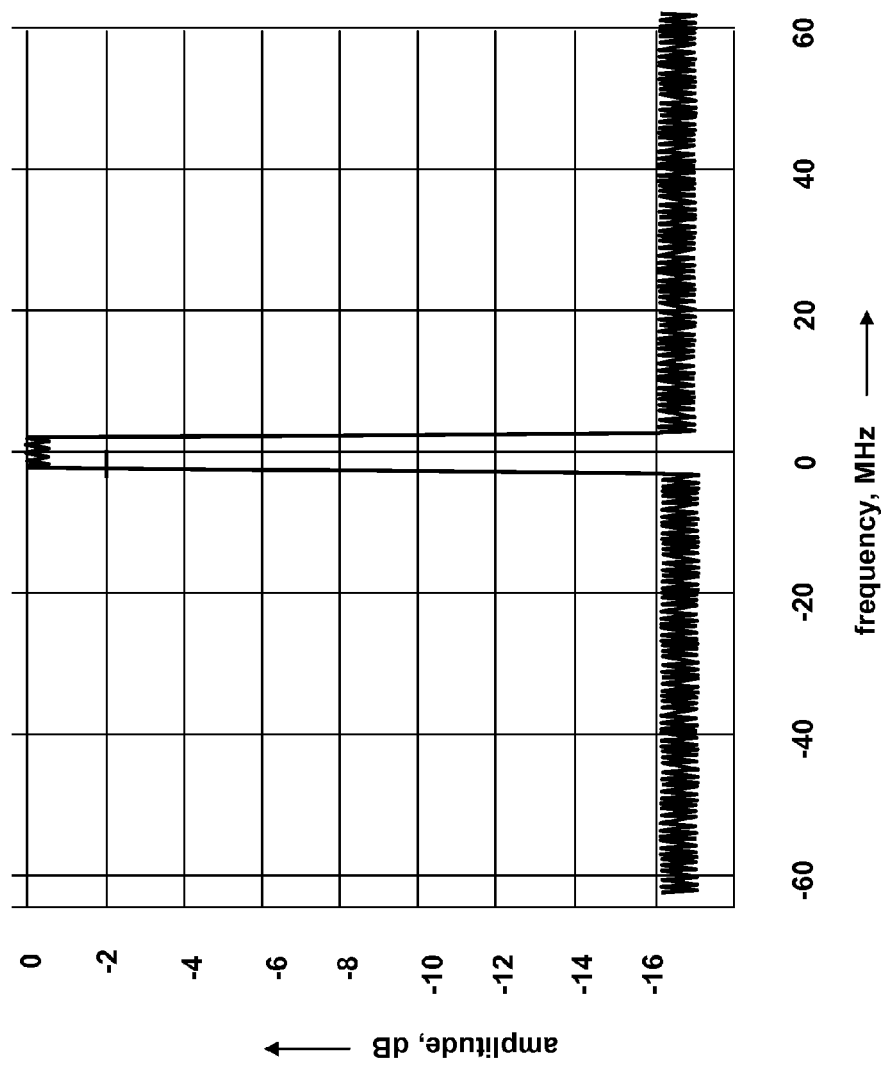

Turning now to FIG. 22, illustrated is a graphical representation of attenuation performance of an exemplary FIR filter. The FIR filter illustrated in FIG. 22 achieves about 16 dB of sinc rejection, but requires no fewer than 200 taps for a 100 MHz bandwidth, which requires a substantial amount of digital signal processing for its implementation. The attenuation performance of a simpler fourth-order elliptical filter illustrated in FIG. 21 appears to be more practical, but requires additional effort to equalize group delay distortion, which can be quite frequency dependent for such filters. The performance of the filters illustrated in FIGS. 21 and 22 illustrate the performance of filters that may be used in conjunction with the principles of the present invention.

Compared to precoding (as described by the reference entitled "EVM-Constrained OFDM Precoding for Reduction of out of Band Emission," by van de Beek, et al, cited above) multiple IFFT operations for one symbol are avoided by the process and method introduced herein. Only one round of IFFT processing is required. Also, filtering generally causes time dispersion of the transmitted signal due to its frequency-dependent delay response and thus contributes an unwelcome component to the cyclic prefix budget. In comparison, the process and method introduced herein do not introduce time dispersion in the transmitted signal. The process and method introduced herein can be combined with filtering or other methods, whereby requirements on filtering, etc., can be relaxed. For example, even a reduction of only one in the filter order of an IIR filter (e.g., the fourth order elliptical filter referred to in FIG. 21) can dramatically reduce time dispersion of the transmitted signal.

Figure 23:
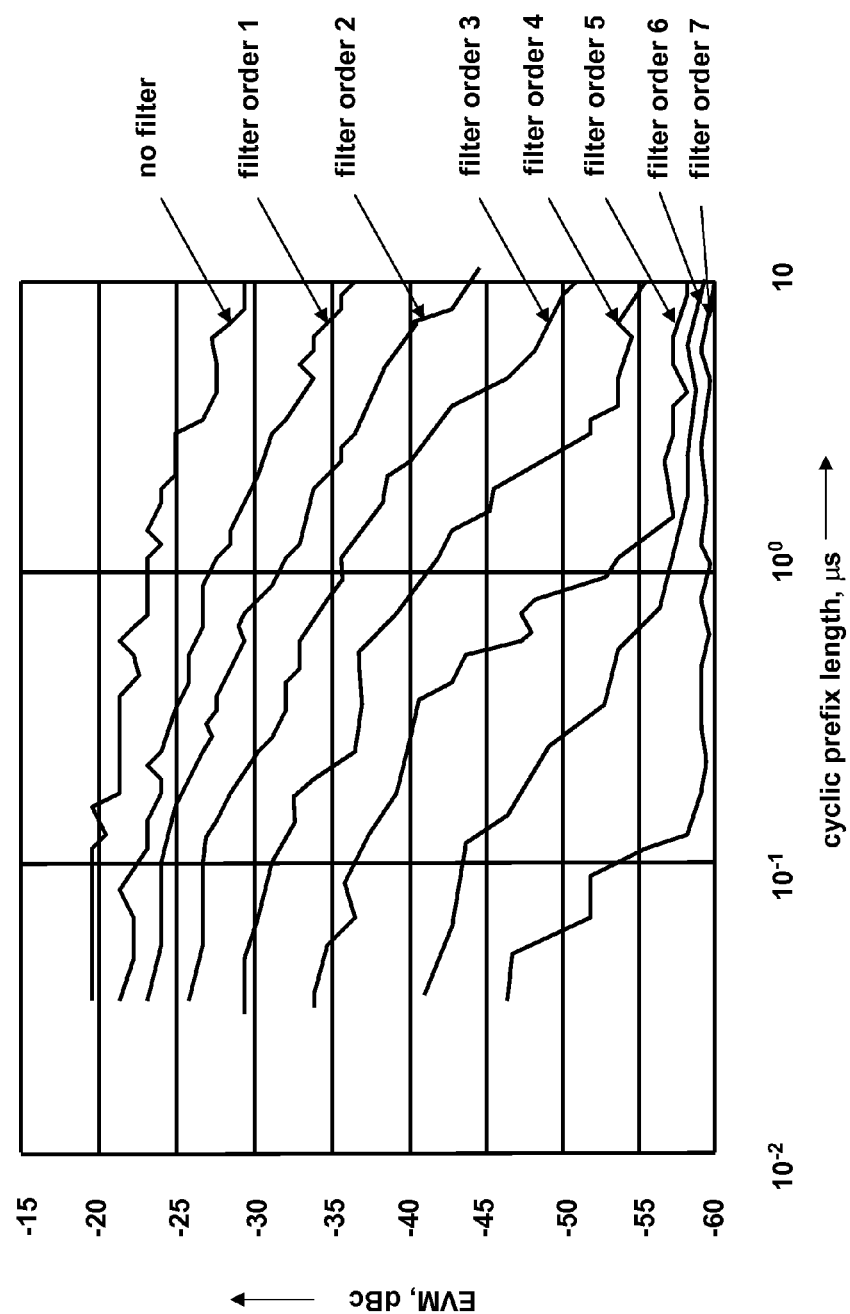
FIG. 23 illustrates a graphical representation of error vector magnitude of a Fast (discrete) Fourier Transform-equalized infinite impulse response filter as a result of intersymbol interference due to filter time dispersion, illustrating application of the principles of the present invention.

Turning now to FIG. 23, illustrated is a graphical representation of the error vector magnitude ("EVM") of a discrete fast Fourier transform—("FFT") equalized IIR filter as a result of intersymbol interference due to filter time dispersion. As an example, see U.S. Patent Application Publication No. 2007/0258526, entitled "Apparatus and Method for Base Band Filtering," by Urvas, published Nov. 8, 2007, which is incorporated herein by reference. FIG. 23 shows the effect of increasing the order of a filter. Half of the cyclic prefix length was used by the communication device to cope with the length of the filter impulse response. The other half was left for dispersion due to multipath propagation. Targeting, for example, an objective of a maximum of −30 dB EVM from intersymbol interference ("ISI"), each reduction of filter order by one scales down unwanted time dispersion by a factor of roughly three.

A communication device formed with a process and method introduced herein advantageously accommodates an arbitrary cyclic shift of the received symbol. For example, any single pilot, reference symbol, or other known signal feature can be used to re-establish a timing reference. Thus, in one aspect, a controller 525, 1345 (in accordance with memory 550, 1320) of a communication element (see, e.g., FIGS. 5, 13, respectively) embodied in, for instance, a user equipment or base station may reorder the temporal sequence of a symbol waveform that follows a previous symbol waveform. The controller determines an amplitude of an end point of a first waveform, determines a point on a second waveform having an amplitude to substantially match the amplitude of the end point of the first waveform. The first and the second waveform can represent a time-domain OFDM or SC-FDMA symbol. The first waveform and the second waveform can be formed with a cyclic prefix or a cyclic postfix. In an embodiment, the controller determines the point on the second waveform that reduces (e.g., minimizes) a magnitude of a difference between the amplitude of the end point of the first waveform and the amplitude of the point on the second waveform. In an embodiment, the controller determines the point on the second waveform wherein a magnitude of a difference between the amplitude of the end point of the first waveform and the amplitude of the point on the second waveform is less than a threshold level. In an embodiment, the controller stores a value of the amplitude of the end point of the first waveform so that the controller can determine the point in the second waveform. In an embodiment, the controller may examine only a portion of the second waveform to determine the point. The controller also appends a beginning portion of the second waveform that is before the point to an end point of the second waveform to re-form the second waveform. Thus, the portion of the second waveform that is after the point is now the first portion of the waveform, and the portion of the second waveform that is before the point is now the second portion of the waveform. The method then prepares to transmit the first waveform followed by the second, re-formed waveform.

Program or code segments making up the various embodiments of the present invention may be stored in a computer readable medium or transmitted by a computer data signal embodied in a carrier wave, or a signal modulated by a carrier, over a transmission medium. For instance, a computer program product including a program code stored in a computer readable medium may form various embodiments of the present invention. The "computer readable medium" may include any medium that can store or transfer information. Examples of the computer readable medium include an electronic circuit, a semiconductor memory device, a read only memory ("ROM"), a flash memory, an erasable ROM ("EROM"), a floppy diskette, a compact disk ("CD")-ROM, an optical disk, a hard disk, a fiber optic medium, a radio frequency ("RF") link, and the like. The computer data signal may include any signal that can propagate over a transmission medium such as electronic communication network communication channels, optical fibers, air, electromagnetic links, RF links, and the like. The code segments may be downloaded via computer networks such as the Internet, Intranet, and the like.

As described above, the exemplary embodiment provides both a method and corresponding apparatus consisting of various modules providing functionality for performing the steps of the method. The modules may be implemented as hardware (embodied in one or more chips including an integrated circuit such as an application specific integrated circuit), or may be implemented as software or firmware for execution by a computer processor. In particular, in the case of firmware or software, the exemplary embodiment can be provided as a computer program product including a computer readable storage structure embodying computer program code (i.e., software or firmware) thereon for execution by the computer processor.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. Also, many of the features, functions and steps of operating the same may be reordered, omitted, added, etc., and still fall within the broad scope of the present invention.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus, comprising:
    a processor; and
    memory including computer program code,
    said memory and said computer program code configured to, with said processor, cause said apparatus to perform at least the following:
    determine an amplitude and set of derivatives at an end point of a first symbol waveform;
    determine an amplitude and set of derivatives at a beginning point of a second symbol waveform;
    insert a guard period waveform having an amplitude and set of derivatives at a first end based on said amplitude and set of derivatives at said end point of said first symbol waveform and an amplitude and set of derivatives at a second end based on said amplitude and set of derivatives at said beginning point of said second symbol waveform; and
    transmit from a wireless communication device a signal comprising both the first symbol waveform and the second symbol waveform,
    wherein the guard period is transmitted between the first symbol waveform and the second symbol waveform.

2. The apparatus as recited in claim 1 wherein said guard period waveform comprises a set of basis waveforms scaled by a set of weighting coefficients.

3. The apparatus as recited in claim 1 wherein said first and second symbol waveforms are produced by an inverse fast Fourier transform in an orthogonal frequency division multiplexing or single-carrier frequency division multiple access communication system.

4. The apparatus as recited in claim 2 wherein said set of weighting coefficients is selected according to a sum-of-squares metric.

5. The apparatus as recited in claim 2 wherein said set of weighting coefficients is selected to reduce signal energy in said guard period waveform.

6. A method, comprising:
    determining an amplitude and set of derivatives at an end point of a first symbol waveform;
    determining an amplitude and set of derivatives at a beginning point of a second symbol waveform;
    inserting a guard period waveform having an amplitude and set of derivatives at a first end based on said amplitude and set of derivatives at said end point of said first symbol waveform and an amplitude and set of derivatives at a second end based on said amplitude and set of derivatives at said beginning point of said second symbol waveform; and
    transmitting from a wireless communication device a signal comprising both the first symbol waveform and the second symbol waveform,
    wherein the guard period is transmitted between the first symbol waveform and the second symbol waveform.

7. The method as recited in claim 6 wherein said guard period waveform comprises a set of basis waveforms scaled by a set of weighting coefficients.

8. The method as recited in claim 6 wherein said first and second symbol waveforms are produced by an inverse fast Fourier transform in an orthogonal frequency division multiplexing or single-carrier frequency division multiple access communication system.

9. The method as recited in claim 7 wherein said set of weighting coefficients is selected according to a sum-of-squares metric.

10. The method as recited in claim 7 wherein said set of weighting coefficients is selected to reduce signal energy in said guard period waveform.

11. A non-transitory computer-readable medium encoding instructions that, when executed in hardware, perform a process, the process comprising:
    determining an amplitude and set of derivatives at an end point of a first symbol waveform;
    determining an amplitude and set of derivatives at a beginning point of a second symbol waveform;
    inserting a guard period waveform having an amplitude and set of derivatives at a first end based on said amplitude and set of derivatives at said end point of said first symbol waveform and an amplitude and set of derivatives at a second end based on said amplitude and set of derivatives at said beginning point of said second symbol waveform; and
    transmitting from a wireless communication device a signal comprising both the first symbol waveform and the second symbol waveform, wherein the guard period is transmitted between the first symbol waveform and the second symbol waveform.

12. The non-transitory computer-readable medium as recited in claim 11, wherein said guard period waveform comprises a set of basis waveforms scaled by a set of weighting coefficients.

13. The non-transitory computer-readable medium as recited in claim 11, wherein said first and second symbol waveforms are produced by an inverse fast Fourier transform in an orthogonal frequency division multiplexing or single-carrier frequency division multiple access communication system.

14. The non-transitory computer-readable medium as recited in claim 12, wherein said set of weighting coefficients is selected according to a sum-of-squares metric.

15. The non-transitory computer-readable medium as recited in claim 12, wherein said set of weighting coefficients is selected to reduce signal energy in said guard period waveform.

* * * * *